United States Patent
Choi et al.

(10) Patent No.: US 10,368,089 B2
(45) Date of Patent: Jul. 30, 2019

(54) VIDEO ENCODING METHOD AND APPARATUS, AND VIDEO DECODING METHOD AND APPARATUS

(71) Applicant: SAMSUNG ELECTRONICS CO., LTD., Suwon-si (KR)

(72) Inventors: Byeong-doo Choi, Suwon-si (KR); Chan-yul Kim, Bucheon-si (KR); Myoung-jin Eom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 589 days.

(21) Appl. No.: 14/763,077

(22) PCT Filed: Jan. 23, 2014

(86) PCT No.: PCT/KR2014/000687
§ 371 (c)(1),
(2) Date: Jul. 23, 2015

(87) PCT Pub. No.: WO2014/116047
PCT Pub. Date: Jul. 31, 2014

(65) Prior Publication Data
US 2015/0358641 A1 Dec. 10, 2015

Related U.S. Application Data

(60) Provisional application No. 61/755,758, filed on Jan. 23, 2013.

(51) Int. Cl.
*H04N 19/587* (2014.01)
*H04N 19/44* (2014.01)
(Continued)

(52) U.S. Cl.
CPC ......... *H04N 19/587* (2014.11); *H04N 19/105* (2014.11); *H04N 19/187* (2014.11);
(Continued)

(58) Field of Classification Search
CPC .. H04N 19/587; H04N 19/105; H04N 19/187; H04N 19/30; H04N 19/44; H04N 19/46; H04N 19/597; H04N 19/70
See application file for complete search history.

(56) References Cited

U.S. PATENT DOCUMENTS 8,428,144 B2 4/2013 Park et al.
8,938,004 B2 * 1/2015 Boyce .................... H04N 19/30
375/240.12
(Continued)

FOREIGN PATENT DOCUMENTS

KR 10-2008-0099245 A 11/2008
KR 10-2012-0079177 A 7/2012
KR 10-2013-0000334 A 1/2013

OTHER PUBLICATIONS

Rusert T., "On VPS extension design", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); URL: http://wftp3.itu.int/av-arch/jctvc-site/,No. JCTVC-L0138, Jan. 7, 2013 (Jan. 7, 2013), pp. 1-7, XP030113626.*

(Continued)

*Primary Examiner* — Maria E Vazquez Colon
(74) *Attorney, Agent, or Firm* — Sughrue Mion, PLLC

(57) ABSTRACT

Disclosed are a video encoding method and a video decoding method. A multilayer video encoding method comprises the steps of: performing an interlayer prediction for a picture of each layer constituting a multilayer video; determining a reference layer to which the picture of each layer refers, on the basis of the result of the interlayer prediction; and adding reference layer information of each layer to a parameter set including the information which is commonly applied to the layers included in the multilayer video.

4 Claims, 19 Drawing Sheets

(51) Int. Cl.
      *H04N 19/70*       (2014.01)
      *H04N 19/30*       (2014.01)
      *H04N 19/597*      (2014.01)
      *H04N 19/105*      (2014.01)
      *H04N 19/46*       (2014.01)
      *H04N 19/187*      (2014.01)

(52) U.S. Cl.
      CPC ............ *H04N 19/30* (2014.11); *H04N 19/44* (2014.11); *H04N 19/46* (2014.11); *H04N 19/597* (2014.11); *H04N 19/70* (2014.11)

(56)                References Cited

U.S. PATENT DOCUMENTS

| | | |
|---|---|---|
| 2008/0089411 A1 | 4/2008 | Wenger et al. |
| 2010/0111167 A1 | 5/2010 | Wu et al. |
| 2010/0195738 A1 | 8/2010 | Zhu et al. |
| 2014/0119441 A1 | 5/2014 | Lee et al. |
| 2014/0177718 A1* | 6/2014 | Rusert .............. H04N 19/00769 375/240.16 |

OTHER PUBLICATIONS

Search Report dated May 8, 2014, issued by the International Searching Authority in counterpart International Application No. PCT/KR2014/000687.
Written Opinion dated May 8, 2014, issued by the International Searching Authority in counterpart International Application No. PCT/KR2014/000687.

* cited by examiner

FIG. 6

| vps_extension( ) { | Descriptor |
|---|---|
|   While ( !byte_aligned( ) ) | |
|     vps_extension_byte_alignment_reservec_one_bit | u(1) |
|   avc_base_codec_flag | u(1) |
|   scalability_mask | u(16) |
|   for( i = 0; i <NumScalabilityTypes; i++ ) { | |
|     dimension_id_len_minusl[ i ] | u(3) |
|   } | |
|   vps_nuh_layer_id_present_flag | u(1) |
|   // layer specific information | |
|   for ( i = 1; i <= vps_max_layers_minus1; i++ ) { | |
|     // mapping of layer ID to scalability dimension IDs | |
|     if( vps_nuh_layer_id_present_flag ) | |
|   layer_id_in_nuh[ i ] | u(6) |
|   for( j = 0; j ,= num_dimension_minus1; j++ ) | |
|     dimension_id[ i ][ j ] | u(v) |
|   } | |
|   for( i = 1;i <=vps_max_layers_minus1; i++ ) | |
|     profile_tier_level( 1, vps_max_sub_layers_minus1) | |
|   for( i = 1;i <=vps_max_layers_minus1; i++ ) | |
| 61 — layer_dependency_present_flag[ i ] | u(1) |
|   for( i= 1 ; i <= vps_max_layers_minus1; i++ ) { | |
|   // layer dependency | |
|   if( layer_dependency_present_flag[i]==1) | |
|     for(j=0; j<i;j++) | |
| 62 — direct_reference_flag[i][j] | u(1) |
|   } | |

FIG. 12A

| pic_parameter_set_rbsp( ) { | Descriptor |
|---|---|
| pic_parameter_set_id | u(6) |
| seq_parameter_set_id | u(4) |
| pps_num_extra_slice_header_bits_for_independent_slices | u(3) |
| pps_num_extra_slice_header_bits_for_dependent_slices | u(3) |
| dependent_slice_segments_enabled_flag | u(1) |
| sign_data_hiding_flag | u(1) |
| cabac_init_present_flag | u(1) |
| num_ref_idx_l0_default_active_minus1 | ue(v) |
| num_ref_idx_l1_default_active_minus1 | ue(v) |
| pic_init_qp_minus26 | se(v) |
| constrained_intra_pred_flag | u(1) |

FIG. 12B

| seq_parameter_set_rbsp( { | Descriptor |
|---|---|
| sps_video_parameter_set_id | u(4) |
| sps_max_sub_layers_minus1 | u(3) |
| sps_temporal_id_nesting_flag | u(1) |
| sps_num_extra_slice_header_bits_for_independent_slices | u(3) |
| sps_num_extra_slice_header_bits_for_dependent_slices | u(3) |
| profile_tier_level(1, sps_max_sub_layers_minus1) | |
| sps_seq_parameter_set_id | u(4) |
| chroma_format_idc | ue(v) |
| if( chroma_format_idc == 3 ) | |
| separate_colour_plane_flag | u(1) |
| pic_width_in_luma_samples | ue(v) |
| pic_height_in_luma_samples | ue(v) |

FIG. 12C

| slice_segment_header( ) { | Descriptor |
|---|---|
|   first_slice_segment_in_pic_flag | u(1) |
|   if( !first_slice_segment_in_pic_flag ) { | |
|     if(dependent_slice_segments_enabled_flag ) | |
|       dependent_slice_segment_flag | u(1) |
|     slice_segment_address | u(v) |
|   } | |
|   if( !dependent_slice_segment_flag ) { | |
|     num_extra_slice_header_bits_independent_slices | u(3) |
|     for ( i = 0; i<num_extra_slice_header_bitfor_independent_slices; i++ ) | |
|       slice_reserved_undetermined_flag[i] | u(1) |
|   } | |
|   if( dependent_slice_segment_flag ) { | |
|     num_extra_slice_header_bits_dependent_slices | u(3) |
|     for ( i = 0; i<num_extra_slice_header_bitfor_dependent_slices; i++ ) | |
|       slice_reserved_undetermined_flag[i] | u(1) |
|   } | |

FIG. 12D

| slice_segmentheader( ) { | Descriptor |
|---|---|
| extra_slice_header_present_flag_1 | u(1) |
| if(extra_slice_header_present_flag_1) { | |
| for ( i = 0; i < m; i++ ) | |
| slice_reserved_undetermined_flag [ i ] | u(1) |
| extra_slice_header_present_flag_2 | u(1) |
| if(extra_slice_header_present_flag_2) { | |
| for ( i = 0; i < n; i++ ) | |
| slice_reserved_undetermined_flag [ i ] | u(1) |
| } | |
| } | |
| | |
| } | |

FIG. 19
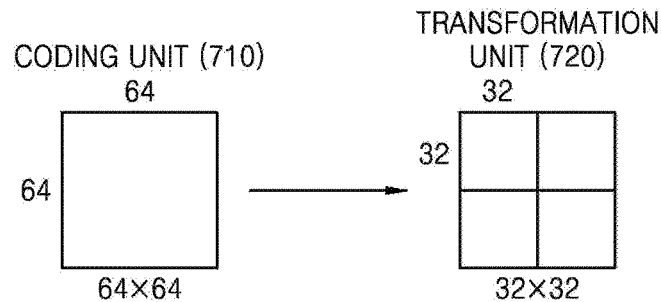
FIG. 20
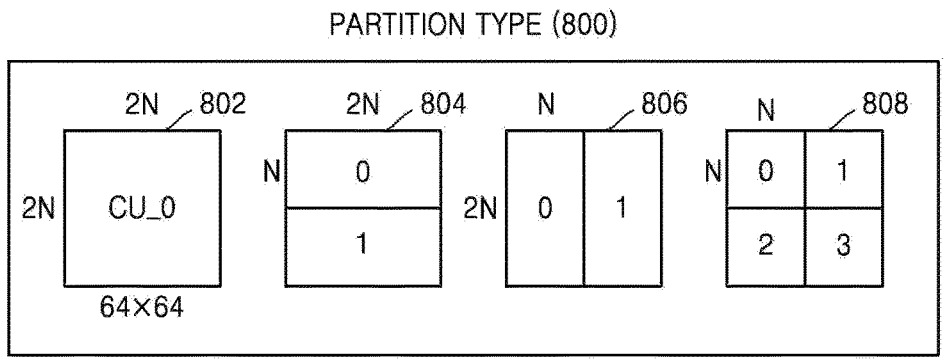
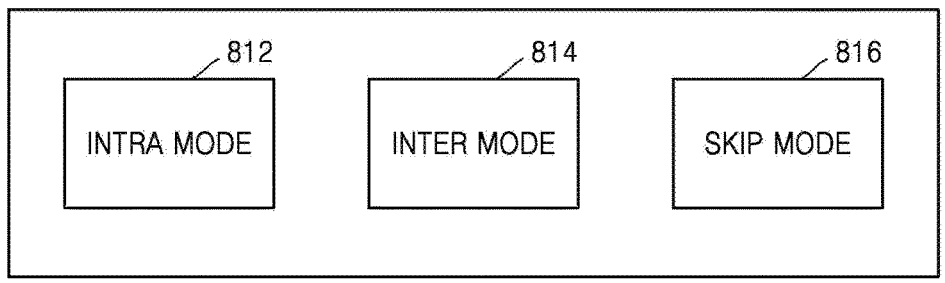
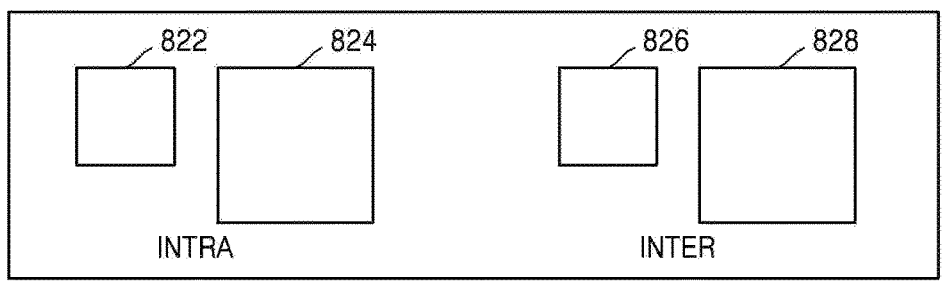

CODING UNIT (1010)

PREDICTION UNIT (1060)

US 10,368,089 B2

VIDEO ENCODING METHOD AND APPARATUS, AND VIDEO DECODING METHOD AND APPARATUS

CROSS-REFERENCE TO RELATED PATENT APPLICATION

This application is a National Stage application under 35 U.S.C. § 371 of International Application No. PCT/KR2014/000687, filed on Jan. 23, 2014, and claims the benefit of U.S. Provisional Application No. 61/755,758, filed on Jan. 23, 2013, in the United States Patent and Trademark Office, the disclosures of which are incorporated herein by reference in their entireties.

BACKGROUND

1. Field

Methods and apparatuses consistent with exemplary embodiments relate to video encoding and decoding methods and, more particularly to, a syntax that signals a reference relationship between layers of a multilayer video and a length of a variable length data unit header.

2. Description of Related Art

As a digital display technology has been developed, a new codec for processing mass storage video data has been proposed.

In the High Efficiency Video Coding (HEVC) standard, a network abstraction layer (NAL) unit of encoded image data may include parameter sets corresponding to header information. The parameter sets may include a video parameter set (VPS), a sequence parameter set (SPS), a picture parameter set (PPS), etc.

Generating a parameter set and encoding or decoding an image to efficiently encode the image according to conventional methods, however, is problematic.

SUMMARY

Aspects of the exemplary embodiments provide efficiently signaling of a reference relationship between layers of a multilayer video. Aspects of the exemplary embodiments also provide efficiently signaling of additional information for determining a length of a variable length data unit header.

According to aspects of the exemplary embodiments, a parameter set including reference layer information is used during an inter-layer prediction. Additional length information for determining a length of a slice header having a variable length is added to the parameter set.

According to aspects of the exemplary embodiments, instead of directly signaling a reference layer index to which each layer refers, whether layers that may be used as reference layers are substantially used as reference layers of a current layer transmitted via a 1-bit flag, thereby improving an encoding efficiency.

According to aspects of the exemplary embodiments, when a slice header has a variable length, length information of the slice header for determining a length of the slice header may be efficiently signaled.

According to an aspect of an exemplary embodiment, there is provided a method of encoding a multilayer video, the method comprising: performing inter-layer prediction on a picture of each layer in the multilayer video; determining a reference layer which the picture of the each layer refers to based on a result of performing the inter-layer prediction; and adding reference layer information of each layer to a parameter set including information commonly applied to layers in the multilayer video.

According to an aspect of an exemplary embodiment, there is provided a method of decoding a multilayer video, the method comprising: acquiring reference layer information of each layer from a parameter set including information commonly applied to layers in the multilayer video; determining a reference layer which a picture in the each layer refers to based on the reference layer information of the each layer; and performing inter-layer prediction on inter-predicted pictures among pictures in the each layer by using the determined reference layer.

According to an aspect of an exemplary embodiment, there is provided a video encoding method comprising: determining a length of a header of a lower data unit; acquiring information regarding an encoding parameter commonly applied to the lower data unit; and adding additional length information of the header of the lower data unit for determining the length of the header of the lower data unit to a parameter set including the obtained encoding parameter.

According to an aspect of an exemplary embodiment, there is provided a video decoding method comprising: acquiring a parameter set comprising information regarding an encoding parameter that is commonly applied to a lower data unit from a bitstream; acquiring additional length information of a header of the lower data unit from the parameter set; and determining a length of the header of the lower data unit based on the additional length information.

BRIEF DESCRIPTION OF THE DRAWINGS

FIG. 6 is an example illustrating a video parameter set (VPS) according to an exemplary embodiment;

FIG. 12A is a diagram illustrating a PPS according to an exemplary embodiment;

FIG. 12B is a diagram illustrating an SPS according to an exemplary embodiment;

FIG. 12C is a diagram illustrating a slice segment header according to an exemplary embodiment;

FIG. 12D is a diagram illustrating a slice segment header according to an exemplary embodiment;

FIG. 19 is a diagram illustrating a relationship between a coding unit and transformation units, according to an exemplary embodiment;

FIG. 20 is a diagram illustrating encoding information of coding units corresponding to a coded depth, according to an exemplary embodiment;

DETAILED DESCRIPTION OF EXEMPLARY EMBODIMENTS

Figure 1:
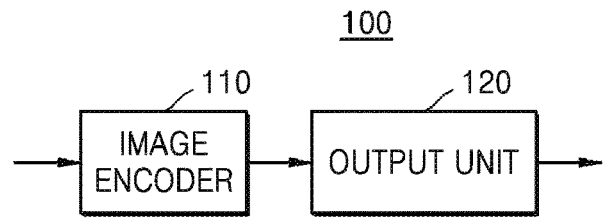
FIG. 1 is a block diagram illustrating a video encoding apparatus according to an exemplary embodiment.

Hereinafter, exemplary embodiments will be more fully described with reference to the accompanying drawings, in which the exemplary embodiments of the invention are shown. However, detailed descriptions about related well known functions or configurations that may obscure the subject matter of the present disclosure are omitted in the following description and the accompanying drawings. In the drawings, like reference numerals denote like elements as much as possible.

The terms and words which are used in the present specification and the appended claims should not be construed as being confined to common meanings or dictionary meanings but should be construed as meanings and concepts matching the technical spirit of the present disclosure in order to describe aspects of the present disclosure in the best fashion. Therefore, the exemplary embodiments and structure described in the drawings of the present disclosure are just exemplary embodiments, and the exemplary embodiments do not represent the entire technological concept and scope of the present disclosure. Therefore, it should be understood that there can be many equivalents and modified embodiments that can substitute for those exemplary embodiments specifically described in this specification.

Throughout the specification, it will be understood that when a part "includes" or "comprises" an element, unless otherwise defined, the part may further include other elements, not excluding the other elements. Also, the terms, such as 'unit' or 'module,' should be understood as a unit that processes at least one function or operation and that may be embodied in a hardware manner, a software manner, or a combination of the hardware manner and the software manner.

The exemplary embodiments will now be more fully described with reference to the accompanying drawings for those of ordinary skill in the art to be able to implement aspects of the present disclosure without any difficulty. The exemplary embodiments may, however, be embodied in many different forms and should not be construed as being limited to the exemplary embodiments set forth herein; rather, these exemplary embodiments are provided so that this disclosure will be thorough and complete, and will fully convey the concept of the disclosure to those of ordinary skill in the art. Also, parts in the drawings unrelated to the detailed description are omitted to ensure clarity of the present disclosure. Like reference numerals in the drawings denote like elements throughout.

The principle of the present disclosure may be applied to an arbitrary intra-frame and inter-frame based encoding standard. The term "image" throughout the specification is used not only as an image itself but also as a "frame," a "field," and a "slice" to indicate a comprehensive term for describing various forms of video image information that may be well known in a related field. A multilayer image may denote a picture included in an image sequence of a plurality of views or a picture included in a base layer and an enhancement layer included in a scalable video.

Hereinafter, a video encoding method and a video decoding method according to an exemplary embodiment will be described with reference to FIGS. 1 through 12. A video encoding method and a video decoding method according to an exemplary embodiment, based on coding units having a tree structure, will also be described with reference to FIGS. 13 through 25.

FIG. 1 is a block diagram illustrating a video encoding apparatus according to an exemplary embodiment.

Referring to FIG. 1, the video encoding apparatus 100 according to an exemplary embodiment may include an image encoder 110 and an output unit 120.

The image encoder 110 may correspond to a video coding layer that performs encoding on input images.

The image encoder 110 according to an exemplary embodiment may split each of pictures included in a multilayer video into maximum coding units having a maximum size, iteratively split the split maximum coding units into coding units, and encode each picture based on the split coding units. A coding unit has a tree structure in which a maximum coding unit is hierarchically split according to a depth. The image encoder 110 may perform prediction on the coding unit using a prediction unit and covert the coding unit using a transformation unit. Video encoding and decoding methods based on the coding unit having the tree structure, the prediction unit, and the transformation unit will be described with reference to FIGS. 14 through 25.

When the multilayer video is a multi-view video, the image encoder 110 may encode each of 'n' view image sequences (n is an integer) as one layer. When the multilayer video is a scalable video, the image encoder 110 may encode each of a base layer image sequence and an enhancement layer image sequence as one layer.

Multilayer video data has a data size larger than a data size of a single layer video data. Thus, the image encoder 110 may perform prediction encoding using correlations between layers included in the multilayer video. In other words, the image encoder 110 may perform prediction encoding on each layer by referring to other layers.

For example, the image encoder 110 may perform inter-view prediction for predicting additional view images by referring to base view images. The image encoder 110 may perform inter-view prediction for predicting additional view images by referring to predetermined additional view images. A disparity between a current image and a reference image and a residual—that is a reference component between the current image and the reference image—may be generated by performing inter-view prediction. Inter prediction and inter-view prediction may be performed based on a data unit: the coding unit, the prediction unit, and the transformation unit.

The image encoder 110 may perform encoding by transforming and quantizing a difference between an original signal and a prediction value generated by performing prediction encoding within a same layer image or by performing inter-layer prediction that refers to images in different layers. Through such an encoding process in the video coding layer (VCL), the image encoder 110 may output residual information relating to the coding unit, prediction mode information, and additional information relating to prediction encoding of the coding unit. In particular, the image encoder 110 may output reference layer information, to which each layer refers, when performing prediction encoding on a predetermined layer image by referring to a different layer image through inter-layer prediction.

The output unit 120 may correspond to a network abstraction layer (NAL) that may add encoded data of the multilayer video and the additional information to a transmission data unit according to a predetermined format and output the transmission data unit. The transmission data unit may be a NAL unit. The output unit 120 may add prediction encoding data of the multilayer video and the additional information relating to prediction encoding output from the image encoder 110 to the NAL unit, and output the NAL unit. In particular, the output unit 120 according to an exemplary embodiment may add the reference layer information of each layer to the NAL unit including parameter sets, for example, a video parameter set (VPS), a sequence parameter set (SPS), and a picture parameter set (PPS), including information commonly applied to image sequences included in the multilayer video. The reference layer information of each layer added to parameter sets may include a flag layer_dependency_present_flag indicating whether each layer refers to a different layer, and a flag direct_reference_flag indicating whether a different layer is used as a reference layer of a current layer. The flags layer_dependency_present_flag and direct_reference_flag may be included in a picture parameter set (PPS).

The output unit 120 may include a syntax extra_slice_header_bits indicating slice header additional length information for determining a length of a slice header in the sequence parameter set (SPS) or the picture parameter set (PPS). The syntax indicating the slice header additional length information may include a syntax extra_slice_header_bits_for_independent_slices indicating a header additional length of an independent slice, and a syntax extra_slice_header_bits_dependent_slices indicating a header additional length of a dependent slice.

Figure 2:
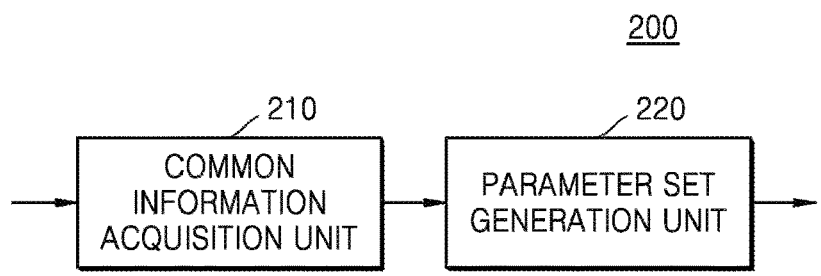
FIG. 2 is a block diagram illustrating a detailed configuration of an output unit of FIG. 1.

FIG. 2 is a block diagram illustrating a detailed configuration of the output unit 120 of FIG. 1.

The output unit 200 may generate and output a NAL unit by including encoded information in a parameter set, such as a VPS, an SPS, a PPS, etc. The parameter set is proposed to prevent an error due to loss of a sequence header or a picture header. The sequence parameter set or the picture parameter set may include identification information included in the sequence header or the picture header, and a syntax element or image information that is commonly used. In addition, the video parameter set may include the syntax element or image information in image data sequences having a plurality of layers. Information included in each parameter set may be used to encode or decode an image corresponding to each piece of image data.

Hereinafter, the sequence parameter set may be referred to as the SPS, the picture parameter set may be referred to as the PPS, and the video parameter set may be referred to as the VPS.

The parameter set may refer to an upper parameter set of each parameter, and thus information included in the upper parameter set may be used to encode or decode image data corresponding to each parameter set. For example, the PPS may refer to an SPS corresponding to a sequence to which a picture corresponding to the PPS belongs, and the SPS may refer to a VPS of scalable image data to which a sequence corresponding to the SPS belongs. Thus, the information of the upper parameter set is acquired so that the information may be used to encode or decode an image corresponding to the PPS or the SPS.

Hereinafter, the upper parameter set may mean a parameter set that may be referred to by a lower parameter set. For example, the VPS may correspond to the upper parameter set with respect to the SPS, and the SPS may correspond to the upper parameter set with respect to the PPS.

Referring to FIG. 2, the output unit 200 may include a common information acquisition unit 210 and a parameter set generation unit 220.

The common information acquisition unit 210 may acquire common information that is commonly applied to at least two or more lower parameter sets having a same upper parameter set. The common information may include information commonly applied to two or more parameter sets of a same priority. For example, the common information acquisition unit 210 may acquire the common information commonly applied to two or more SPSs that refer to a same VPS.

According to an exemplary embodiment, the common information may include at least one piece of image format information of image data that is to be encoded, bit depth information, resolution information, and three-dimensional (3D) encoding information. The above-described information is included in an upper parameter set that may be processed prior to a lower parameter set so that the information may be used in session negotiation or contents selection, which will be described later, during a process of decoding an image. The session negotiation or the contents selection will be described in more detail with reference to an image decoding apparatus 300.

The parameter set generation unit 220 may add the common information acquired by the common information acquisition unit 210 to an upper parameter set or to at least one of lower parameter sets including the common information. Thus, the lower parameter set may acquire the common information by referring to the upper parameter set to which the common information is added or to at least one lower parameter set.

Therefore, according to an exemplary embodiment, the common information that may be redundantly added to at least two or more lower parameter sets, the upper parameter set, or at least one lower parameter set, thereby minimizing information that is encoded without redundantly adding the common information to two or more lower parameter sets.

With respect to two or more lower parameter sets into which the common information is inserted, the common information may be acquired during a subsequent decoding process by referring to the upper parameter set to which the common information is added or the at least one lower parameter set.

The parameter set generation unit 220 according to an exemplary embodiment may add the flag layer_dependency_present_flag indicating whether each layer refers to a different layer and the flag direct_reference_flag indicating whether a different layer is used as a reference layer of a current layer, as reference layer information of each layer of multilayer. The parameter set generation unit 220 may include the syntax extra_slice_header_bits indicating slice header additional length information for determining a length of a slice header in the VPS or the PPS. The syntax indicating the slice header additional length information may include the syntax extra_slice_header_bits_for_independent_slices indicating a header additional length of an independent slice and the syntax extra_slice_header_bits_dependent_slices indicating a header additional length of a dependent slice.

Figure 3:
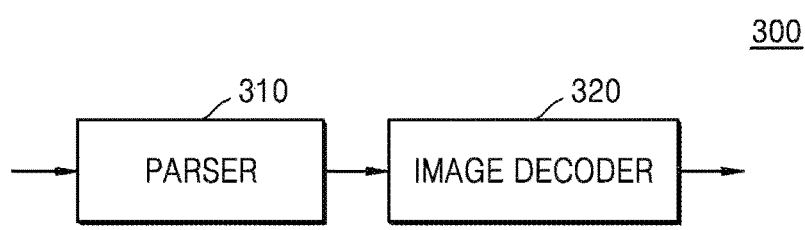
FIG. 3 is a block diagram illustrating a video decoding apparatus according to an exemplary embodiment.

FIG. 3 is a block diagram illustrating a video decoding apparatus according to an exemplary embodiment.

Referring to FIG. 3, the video decoding apparatus 300 may include a parser 310 and an image decoder 320.

The parser 310 may receive and parse a bitstream of encoded image data and may acquire and output syntax and flag information of the encoded image data. The parser 310 according to an exemplary embodiment may acquire the flag layer_dependency_present_flag indicating whether each layer refers to a different layer and the flag direct_reference_flag indicating whether a different layer is used as a reference layer of a current layer, from parameter sets.

The parser 310 may acquire the syntax extra_slice_header_bits indicating slice header additional length information for determining a length of a slice header in the VPS or the PPS. The syntax indicating the slice header additional length information may include the syntax extra_slice_header_bits_for_independent_slices indicating a header additional length of an independent slice and the syntax extra_slice_header_bits_dependent_slices indicating a header additional length of a dependent slice.

The image decoder 320 decodes an image based on the obtained syntax and flag information. The image decoder 320 according to an exemplary embodiment may perform decoding using coding units of a hierarchical structure in which a maximum coding unit is split based on depth. A decoding process using the coding units of the hierarchical structure will be described with reference to FIG. 13.

Figure 4:
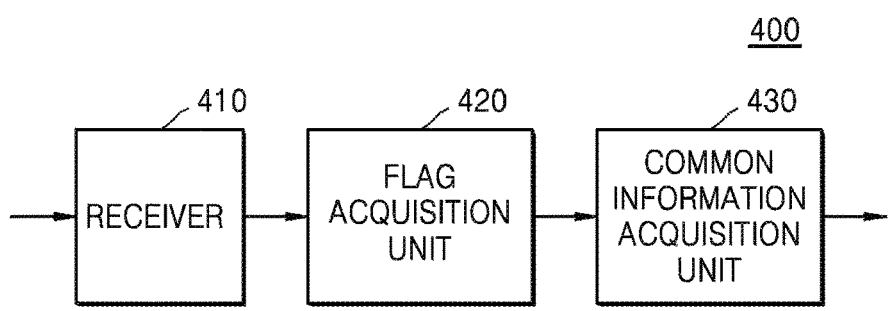
FIG. 4 is a block diagram illustrating a detailed configuration of a parser of FIG. 3.

FIG. 4 is a block diagram illustrating a detailed configuration of the parser 310 of FIG. 3.

Referring to FIG. 4, a receiver 410 may receive and parse a bitstream of encoded image data and extract a parameter set, a syntax, and a flag from the parsed image data. A flag acquisition unit 420 may acquire a flag indicating whether common information is included in at least one of an upper parameter set and a lower parameter set from the parsed bitstream. With respect to at least one lower parameter set, the common information may be acquired by referring to the upper parameter set or the lower parameter set according to a flag value. That is, an image decoding apparatus 400 may acquire the common information by referring to the upper parameter set or the lower parameter set including the common information when decoding an image corresponding to the at least one lower parameter set.

The flag acquisition unit 420 may acquire the flag layer_dependency_present_flag indicating whether a current layer is a dependent layer including a picture predicted by referring to a different layer or is an independent layer that may be independently decoded without referring to a different layer. If the flag layer_dependency_present_flag is 0, the current layer is an independent layer. If the flag layer_dependency_present_flag is 1, the current layer is a dependent layer that refers to a different layer.

A common information acquisition unit 430 may acquire the common information from the upper parameter set or the lower parameter set according to the flag value acquired by the flag acquisition unit 420.

The common information acquisition unit 430 may acquire the flag direct_reference_flag indicating whether a different layer is used as a reference layer of the current layer from one of a VPS, an SPS, and a PPS. The common information acquisition unit 430 may acquire the syntax extra_slice_header_bits indicating slice header additional length information for determining a length of a slice header from one of the VPS, the SPS, and the PPS. The syntax extra_slice_header_bits indicating the slice header additional length information may include the syntax extra_slice_header_bits_for_independent_slices indicating a header additional length of an independent slice and the syntax extra_slice_header_bits_dependent_slices indicating a header additional length of a dependent slice.

Hereinafter, the flag direct_reference_flag indicating whether a different layer added to a parameter set is used as the reference layer of the current layer and the syntax extra_slice_header_bits indicating the slice header additional length information for determining the length of the variable slice header will be described in detail.

Figure 5:
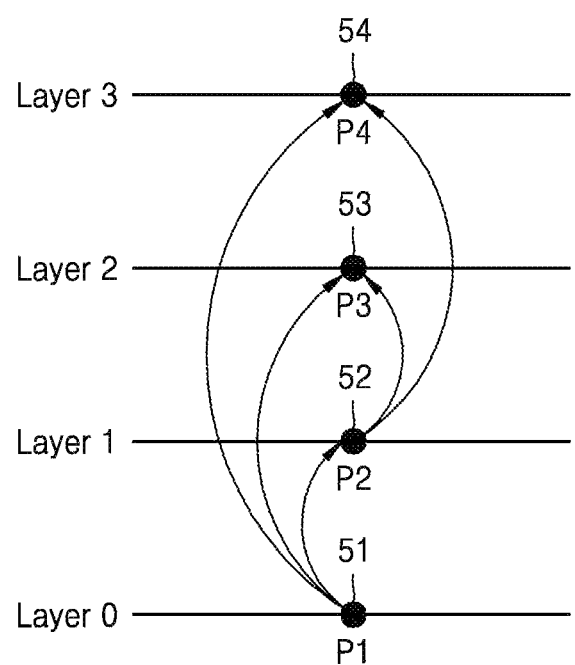
FIG. 5 is a diagram illustrating an example of an inter-layer prediction structure in a multilayer video.

FIG. 5 is a diagram illustrating an example of an inter-layer prediction structure in a multilayer video. Arrows of FIG. 5 indicate reference directions. That is, pictures in which arrows start are reference pictures, and pictures in which arrows end are referenced pictures using reference pictures. The layer denotes a layer index, such as, for example, index 0 corresponding to layer 0.

As described above, the video encoding apparatus 100 according to an exemplary embodiment may perform inter-layer prediction by referring to pictures of a different layer when performing prediction encoding on pictures included in an image sequence of each layer. Referring to FIG. 5, it is assumed that a picture P2 52 of a Layer 1 is predicted by referring to a picture P1 51 of a Layer 0, a picture P3 53 of a Layer 2 is predicted by referring to the picture P1 51 of the Layer 0 and the picture P2 52 of the Layer 1, and a picture P4 54 of a Layer 3 is predicted by referring to the picture P1 51 of the Layer 0 and the picture P2 52 of the Layer 1. It is also assumed that the Layer 0 is an independent layer that does not refer to an image of a different layer, and the Layers 1, 2, and 3 are dependent layers that refer to different layers.

To output a reference relationship between multilayer of FIG. 5, the output unit 120 may determine, for each layer, whether a picture that refers to a different layer is present, determine that a layer that does not refer to a different layer is the independent layer, and determine that a layer that refers to a different layer is the dependent layer. The output unit 120 may generate a flag layer_dependency_present_flag[i] indicating whether a layer having an index i is a dependent layer including a picture predicted by referring to a different layer based on a result of determination. If the flag layer_dependency_present_flag[i] is 0, the layer having the index i is the independent layer. If the flag layer_dependency_present_flag[i] is 1, the layer having the index i is the dependent layer that refers to a different layer. In FIG. 5, because the Layer 0 is the only independent layer, layer_dependency_present_flag[0]=0, and because the Layers 1 through 3 are the dependent layers, layer_dependency_present_flag[0]=1, layer_dependency_present_flag[0]=1, and layer_dependency_present_flag[0]=1.

The output unit 120 may generate the flag direct_reference_flag indicating whether a different layer is used as a reference layer with respect to the dependent layers and add generated flag information to at least one of a VPS, an SPS, and a PPS.

In more detail, the output unit 120 may generate and add a flag direct_reference_flag[i][j] indicating whether the layer i having the index i refers to a layer j having an index j (j is an integer) to at least one of the VPS, the SPS, and the PPS. Hereinafter, it is assumed that the inter-layer prediction structure may be a structure in which the layer i having the index i is predicted by referring to only a layer having an index smaller than i. The layer i having the index i is arranged not to refer to a layer having an index greater than i. In other words, it is assumed that each layer is rearranged according to the inter-layer prediction structure so that each layer is arranged to refer only to a layer having an index smaller than (i−1). If direct_reference_flag[i][j] is 0, the layer j is not used as a reference layer of the layer i. If direct_reference_flag[i][j] is 1, the layer j is used as the reference layer of the layer i.

Referring to the example of FIG. 5, because the picture P2 52 of the Layer 1 is predicted by referring to the picture P1 51 of the Layer 0, direct_reference_flag[i][j] is 1. Because the picture P3 53 of the Layer 2 is predicted by referring to the picture P1 51 of the Layer 0 and the picture P2 52 of the Layer 1, direct_reference_flag[2][0]=1; direct_reference_flag[2][1]=1. Because the picture P4 54 of the Layer 3 is predicted by referring to the picture P1 51 of the Layer 0 and the picture P2 52 of the Layer 1, direct_reference_flag[3][0]=1; direct_reference_flag[3][1]=1; direct_reference_flag[3][2]=0.

As described above, as the flag direct_reference_flag[i][j] indicating whether the layer i having the index i refers to the layer j having the index j (j is an integer) is used, a number of bits necessary for indicating the reference layer information in a multilayer prediction structure is reduced. That is, according to an exemplary embodiment, compared to a case of transmitting an index value of a reference layer to which each layer refers, the number of bits used to signal the reference layer information may be reduced by using flag information of a 1 bit indicating whether each layer is used as the reference layer.

FIG. 6 is an example illustrating a video parameter set (VPS) according to an exemplary embodiment.

Referring to FIG. 6, the VPS includes vps_max_layers_minus1 having a value corresponding to {(a number of all layers included in a multilayer video)−1}. The parser 310 of a decoder may calculate a value of vps_max_layers_minus1+1 to determine a number of all layers included in a video.

The VPS also includes layer_dependency_present_flag[i] 61 indicating whether a layer having the index i is an independent layer or a dependent layer. The index i is an integer from 0 to vps_max_layers_minus1.

The VPS includes a flag direct_reference_flag[i][j] indicating whether the layer j having the index j (j is an integer from 0 to (i−1)) is used as a reference layer of a current layer i with respect to a layer having a value of 1 for the layer_dependency_present_flag[i], i.e., the dependent layer. As described above, if direct_reference_flag[i][j] is 0, the layer j is not used as a reference layer of the layer i. If direct_reference_flag[i][j] is 1, the layer j is used as the reference layer of the layer i.

Meanwhile, the decoder may acquire a number NumDirectRefLayers[i] of all layers to which the layer i having the index i refers and RefLayerId[i][j] indicating an index of a reference layer to which the Layer i refers according to a next pseudo-code by using direct_reference_flag[i][j]. layer_id_in_nuh[j] means an intrinsic index allocated to the layer j having the index j.

```
{
  for(i=1;i<=vps_max_layers_minus1; i++){
    for (j=0, k=0, NumDirectRefLayers[i]=0; j<i; j++) {
      if (direct_dependency_flag[i][j]==1)
      {
        RefLayerId[i][k++]=layer_id_in_nuh[j];
        NumDirectRefLayers[i]++;
      }
    }
  }
}}
```

Figure 7:
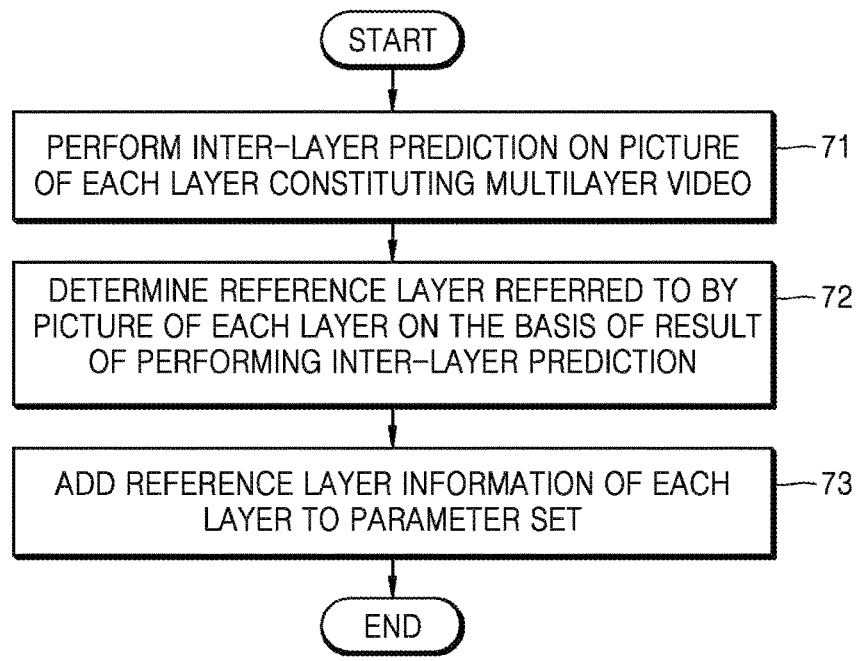
FIG. 7 is a flowchart illustrating a video encoding method according to an exemplary embodiment.

FIG. 7 is a flowchart illustrating a video encoding method according to an exemplary embodiment.

Referring to FIG. 7, in operation 71, the image encoder 110 may perform inter-layer prediction on a picture of each layer in a multilayer video. In operation 72, the image encoder 110 may determine and output a reference layer to which the picture of each layer refers based on a result of performing inter-layer prediction. In operation 73, the output unit 120 may add reference layer information of each layer to a parameter set including information commonly applied to layers included in the multilayer video. As described above, the parameter set may be one of a VPS, an SPS, and a PPS. The output unit 120 may also add the flag layer_dependency_present_flag indicating whether each layer refers to a different layer as the reference layer information of each layer of multilayer. The reference layer information may use the one bit flag direct_reference_flag indicating whether a different layer is used as a reference layer of a current layer.

Figure 8:
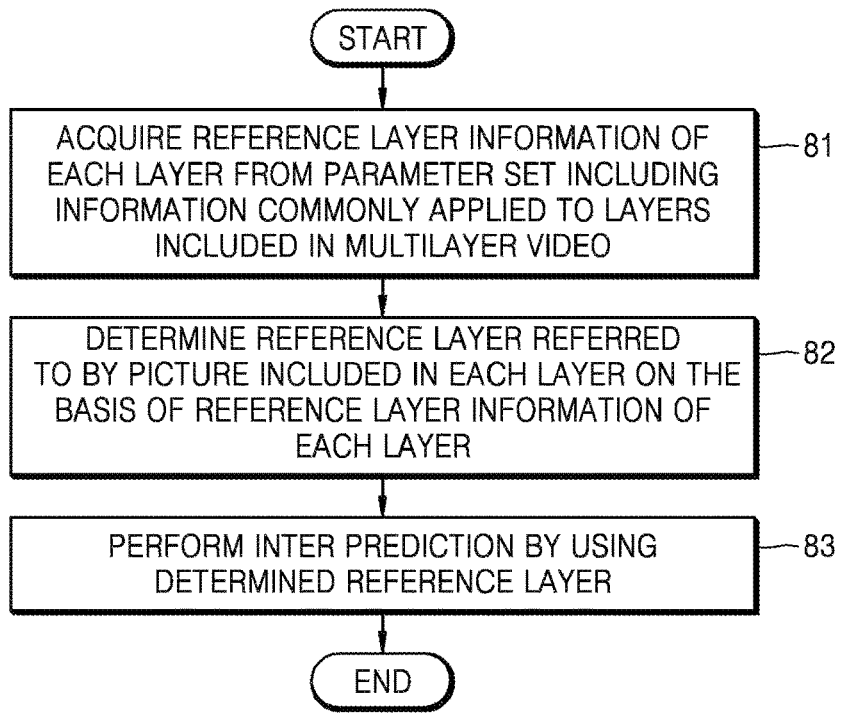
FIG. 8 is a flowchart illustrating a video decoding method according to an exemplary embodiment.

FIG. 8 is a flowchart illustrating a video decoding method according to an exemplary embodiment.

Referring to FIG. 8, in operation 81, the parser 310 may acquire reference layer information of each layer from a parameter set including information commonly applied to layers included in a multilayer video. As described above, the parameter set may be one of a VPS, an SPS, and a PPS.

In operation 82, the parser 310 may determine a reference layer to which a picture included in each layer refers based on the reference layer information of each layer. As described with reference to FIG. 5 above, with respect to a dependent layer, direct_reference_flag[i][j] may be acquired from the parameter set, and whether the layer i refers to the layer j may be determined.

In operation 83, the image decoder 320 may perform inter prediction on inter predicted pictures among the picture to which each layer refers by using the determined reference layer.

Figure 9:
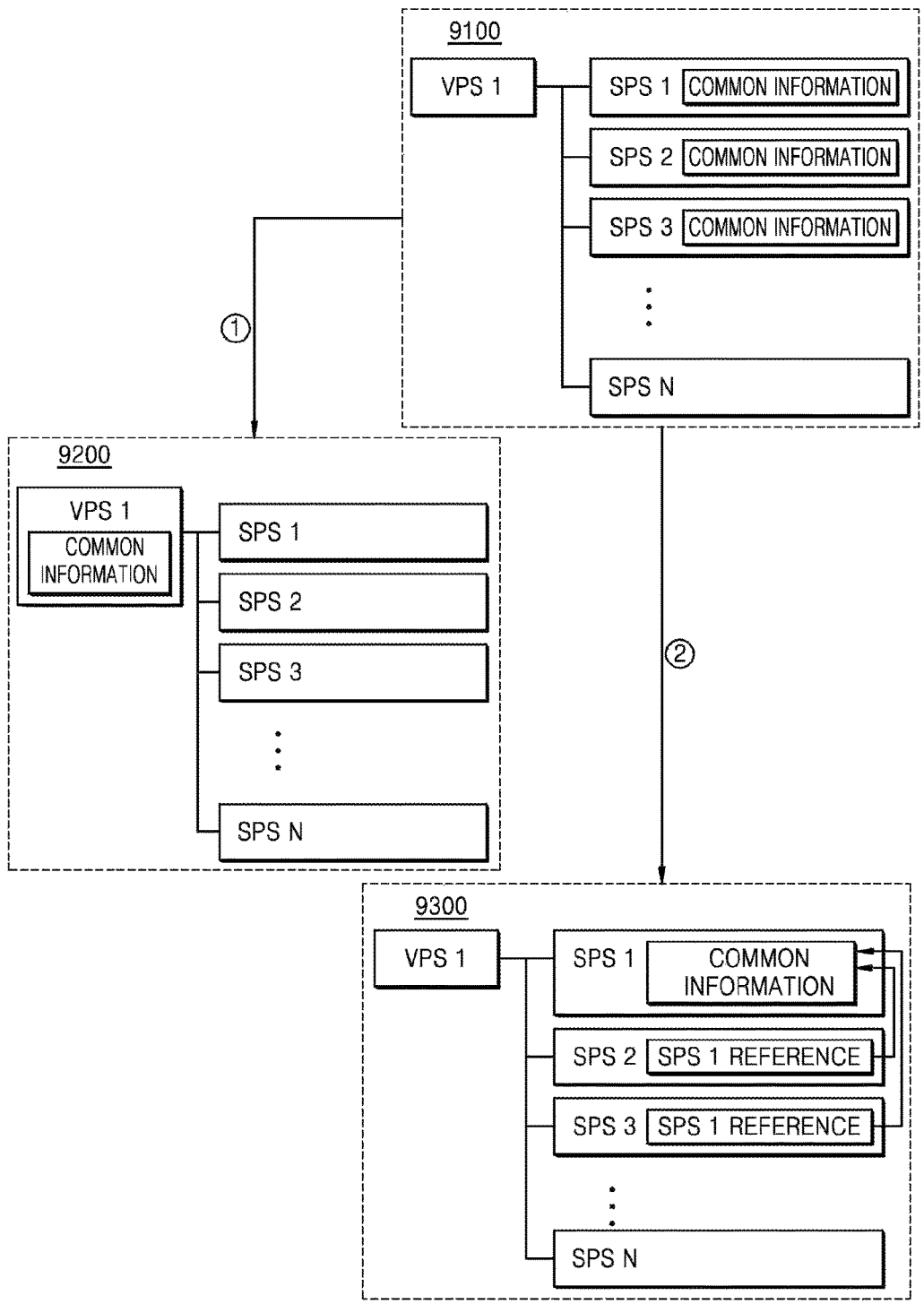
FIG. 9 is a reference view illustrating a parameter generation method according to an exemplary embodiment.

FIG. 9 is a reference view illustrating a parameter generation method according to an exemplary embodiment.

As shown reference numeral 9100 of FIG. 9, it is assumed that VPS 1 and SPS 1 through SPS N that refer to VPS 1 are present. When information commonly included in SPS 1, SPS 2, and SPS 3 is present, parameter sets may be configured as a reference numeral 9200 or 9300.

Referring to the reference numeral 9200, the common information included in SPS 1, SPS 2, and SPS 3 is included in VPS 1. Thus, the common information included in at least two or more SPSs may not be redundantly encoded and may be encoded one time in VPS 1, thereby improving the encoding efficiency. SPS 1, SPS 2, and SPS 3 refer to VPS 1 during a decoding process, and thus the common information may be acquired.

Referring to the reference numeral 9300, the common information included in SPS 1, SPS 2, and SPS 3 is included in SPS 1. Thus, the common information included in at least two or more SPSs may not be redundantly encoded and may be encoded one time in SPS 1, thereby improving the encoding efficiency. When a parameter set is configured as the reference numeral 9300, a data size of VPS 1 may not increase compared to the case of the reference numeral 9200. In the case of the reference numeral 9300, SPS 2 and SPS 3 refer to SPS 1 during the decoding process, and thus the common information may be acquired.

Meanwhile, additional information relating to a slice is included in a header (hereinafter, referred to as a "slice header") including encoding information of each slice. In particular, the slice header may include type information indicating a type of data that the current data includes. For example, the slice header may include the type information, such as whether a current slice is a slice I, P, or B. The slice header may also include the type information indicating a slice using inter-layer prediction. As described above, the slice header includes various types of additional information relating to the current slice. A length of the slice header is generally invariable. When the slice header of the invariable length is used, a number of bits used to indicate the type information of the slice header is also limited. When the number of bits of a slice is limited, a data type transmitted through the slice header may be limited. However, various types of coding methods are expected appear according to the development of a video codec, and use of the slice header of a limited length may be restricted for future expansion and use.

Therefore, the slice header according to an exemplary embodiment may have a variable length. In more detail, the slice header according to an exemplary embodiment is configured as [(a slice header bit of an invariable length)+(an additional slice header bit)]. The slice header bit of the invariable length may be determined according to a coding method. For example, the slice header bit of the invariable length may have a length of 2 bytes, i.e. 16 bits. The additional slice header bit is added to the slice header bit of the invariable length to configure the entire slice header. A length of the additional slice header bit may be arbitrarily set. For example, the additional slice header bit may be set as 1 byte, i.e., 8 bits. To be compatible with a conventional video codec having a slice header of a conventional invariable length, it is necessary to signal whether to use the additional slice header bit and information regarding a length of the additional slice header bit. In particular, a codec receives bitstreams including 0 and 1 and acquires a predetermined number of bits according to a predefined rule, thereby determining the slice header. Thus, to identify which part of a bitstream corresponds to the slice header when a predefined length of the slice header is changed, information of the changed length of the slice header needs to be signaled when the length of the slice header is changed.

Therefore, the output unit 120 may add the syntax extra_slice_header_bits indicating slice header additional length information to one parameter set of a VPS, an SPS, and a PPS. When extra_slice_header_bits is included in one parameter set of the VPS, the SPS, and the PPS, the parser 310 of a decoder may determine lengths of additional slice header bits that additionally configure the slice header besides the predefined length of the slice header and may parse the lengths of additional slice header bits that configure a part of the entire slice header from the bitstream. The syntax extra_slice_header_bits indicating the slice header additional length information may include the syntax extra_slice_header_bits_for_independent_slices indicating a header additional length of an independent slice that is independently decodable and the syntax extra_slice_header_bits_dependent_slices indicating a header additional length of a dependent slice. That is, the independent slice and the dependent slice may have separate slice header lengths.

FIG. 12A is a diagram illustrating a PPS according to an exemplary embodiment.

Referring to FIG. 12A, the PPS may include pps_num_extra_slice_header_bits_for_independent_slices and pps_num_extra_slice_header_bits_for_dependent_slices.

pps_num_extra_slice_header_bits_for_independent_slices indicates a length, i.e., a number of bits, of additional slice header bits of independent slices that refer to a current PPS. For example, if pps_num_extra_slice_header_bits_for_independent_slices has a value of 4, in addition to a slice header of an invariable length, additionally four bits correspond to information regarding the slice header. pps_num_extra_slice_header_bits_for_dependent_slices indicates a length, i.e., a number of bits, of additional slice header bits of dependent slices that refer to the current PPS.

FIG. 12B is a diagram illustrating an SPS according to an exemplary embodiment.

Referring to FIG. 12B, the SPS may include sps_num_extra_slice_header_bits_for_independent_slices and sps_num_extra_slice_header_bits_for_independent_slices. sps_num_extra_slice_header_bits_for_independent_slices indicates a length, i.e., a number of bits, of additional slice header bits of independent slices that refer to a current SPS. For example, if sps_num_extra_slice_header_bits_for_independent_slices has a value of 4, in addition to a slice header of an invariable length in a received bitstream, additionally four bits correspond to information regarding an independent slice header. sps_num_extra_slice_header_bits_for_dependent_slices indicates a length, i.e., a number of bits, of additional slice header bits of dependent slices that refer to the current SPS.

FIG. 12C is a diagram illustrating a slice segment header according to an exemplary embodiment.

Referring to FIG. 12C, the slice segment header includes a flag depedent_slice_segment_flag indicating whether a current slice is an independent slice or a dependent slice. If depedent_slice_segment_flag is 0, the current slice is an independent slice segment. If depedent_slice_segment_flag is 1, the current slice is a dependent slice segment.

num_extra_slice_header_bits_for_independent_slices indicates a length of an additional slice header with respect to the independent slice segment. num_extra_slice_header_bits_for_dependent_slices indicates a length of the additional slice header with respect to the dependent slice segment.

In addition to additional slice header length information included in the PPS or the SPS described with reference to FIGS. 12A and 12B above, the length of the additional slice header may be independently included in a slice unit as shown in FIG. 12C. The length of the additional slice header may be set according to a type of the current slice, i.e., whether the current slice is the independent slice segment or the dependent slice segment. That is, the length of additional slice header may be separately set for the independent slice segment and the dependent slice segment.

FIG. 12D is a diagram illustrating a slice segment header according to another embodiment.

Even when additional slice header length information is included in a PPS or an SPS as shown in FIGS. 12A and 12B, whether a current slice has a separate additional slice header length may be signaled to a slice segment header.

Referring to FIG. 12D, extra_slice_header_present_flag1 indicates whether the current slice has an additional length. That is, if extra_slice_header_present_flag1 is 0, the current slice does not have the additional length, and, if extra_slice_header_present_flag1 is 1, the current slice has the additional length. extra_slice_header_present_flag2 indicates whether the current slice uses an additional length different from an additional length included in the SPS or the PPS. That is, if extra_slice_header_present_flag2 is 0, a current slice header uses an additional slice header length defined in the SPS or the PPS, and, if extra_slice_header_present_flag2 is 1, the current slice header has an additional slice header length different from the additional slice header length defined in the SPS or the PPS. As described above, extra_slice_header_present_flag1 or extra_slice_header_present_flag2 may be used in a slice unit, thereby determining the additional slice header length separately from the additional slice header length defined in the SPS or the PPS.

Meanwhile, instead of including variable additional slice header length information in the SPS or the PPS, only a predetermined flag indicating whether to use the additional slice header may be included in the SPS or the PPS, and the additional slice header length may be a constant value. In other words, whether slices that refer to a current SPS or PPS use the additional slice header may be only signaled through the predetermined flag included in the SPS or the PPS, and the additional slice header length may be set to have a constant value, for example, 8 bits. When the additional slice header length is used as described above, there is no need to separately transmit the additional slice header length.

Figure 10:
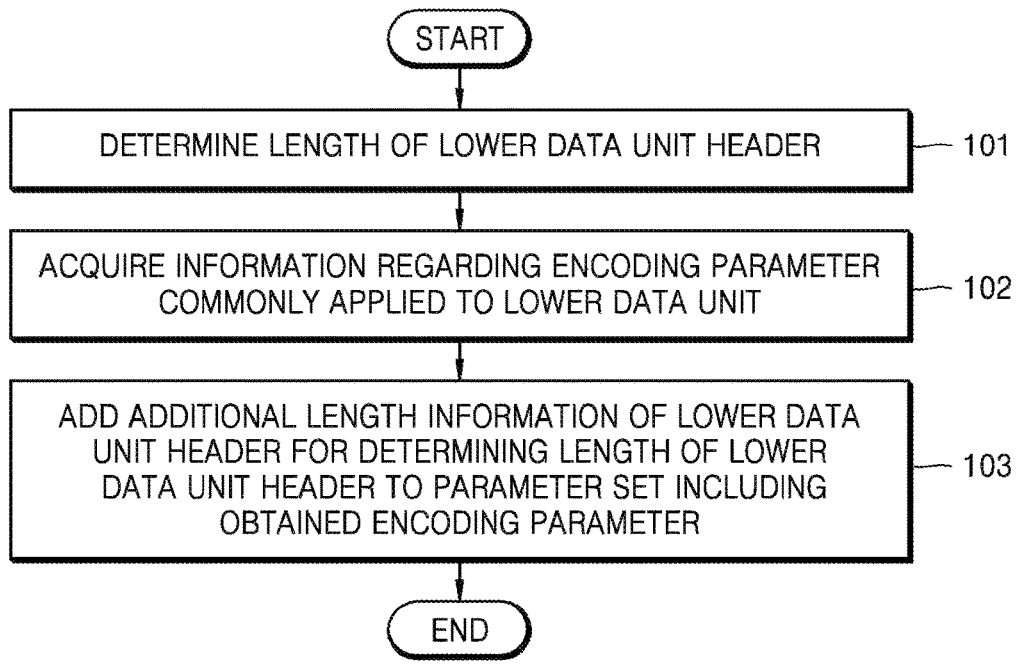
FIG. 10 is a flowchart illustrating a video encoding method according to an exemplary embodiment.

FIG. 10 is a flowchart illustrating a video encoding method according to an exemplary embodiment.

Referring to FIG. 10, in operation 101, the output unit 120 may determine a length of a lower data unit header. That is, the output unit 120 determines whether to use a slice unit header of a fixed length or a slice header of a variable length.

In operation 102, the output unit 120 acquires information regarding an encoding parameter commonly applied to a lower data unit. That is, the output unit 120 acquires information regarding parameters commonly applied to the lower data unit such as a VPS, a PPS, an SPS, etc. and generates a parameter set such as the VPS, the PPS, and the SPS. In particular, in operation 103, the output unit 120 adds additional length information of the lower data unit header for determining a length of the lower data unit header to the parameter set. As described above, the additional length information may include the syntax extra_slice_header_bits_for_independent_slices indicating a header additional length of an independent slice that is independently decodable and the syntax extra_slice_header_bits_dependent_slices indicating a header additional length of a dependent slice.

Figure 11:
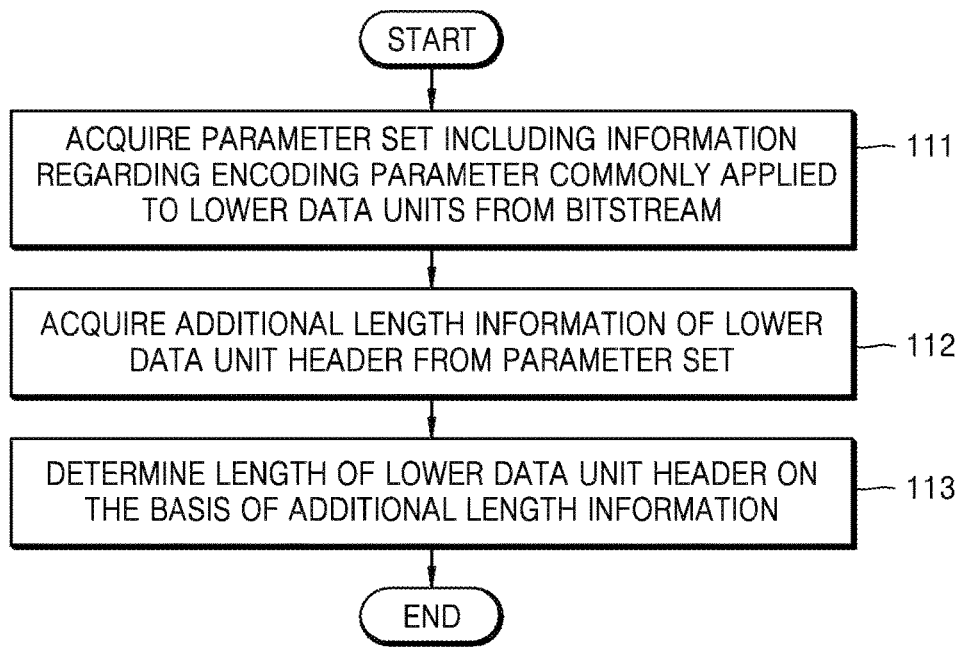
FIG. 11 is a flowchart illustrating a video decoding method according to an exemplary embodiment.

FIG. 11 is a flowchart illustrating a video decoding method according to an exemplary embodiment.

Referring to FIG. 11, in operation 111, the parser 310 acquires a parameter set including information regarding an encoding parameter commonly applied to lower data units from a bitstream. The parameter set may be one of a VPS, an SPS, and a PPS. In operation 112, the parser 310 acquires additional length information of a lower data unit header from the parameter set. That is, the parser 310 acquires the additional length information such as the syntax extra_slice_header_bits_for_independent_slices indicating a header additional length of an independent slice that is independently decodable and the syntax extra_slice_header_bits_dependent_slices indicating a header additional length of a dependent slice.

In operation 113, the parser 310 determines a length of the lower data unit header based on the additional length information. When the additional length information is included, an encoder and decoder may receive bits according to an additional length indicating the additional length information in addition to a slice header of a predetermined invariable length and parse the slice header.

A video encoding method and a video decoding method based on coding units according to a tree structure will be described with reference to FIGS. 13 through 25. The video encoding method and the video decoding method based on coding units according to the tree structure that will now be described below are related to processes of encoding and decoding pictures included in a video that are performed by the image encoder 110 of the video encoding apparatus 100 of FIG. 1 and the image decoder 320 of the video decoding apparatus 300 of FIG. 3.

Figure 13:
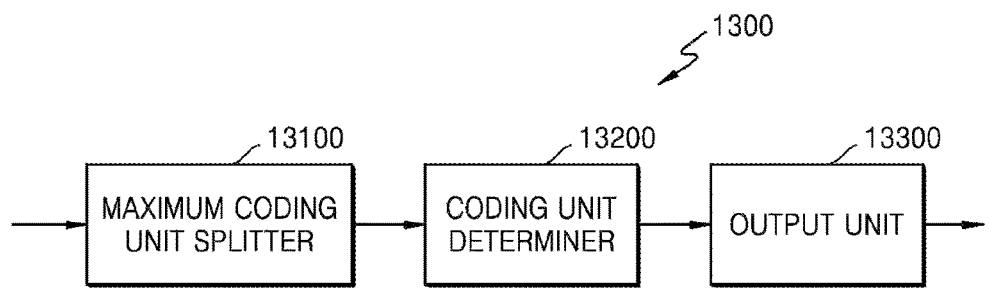
FIG. 13 is a block diagram illustrating a video encoding apparatus based on coding units having a tree structure, according to an exemplary embodiment.

FIG. 13 is a block diagram illustrating a video encoding apparatus 100 based on coding units according to a tree structure, according to an exemplary embodiment of the present invention.

The video encoding apparatus 13000 involving video prediction based on coding units according to a tree structure according to an exemplary embodiment includes a maximum coding unit splitter 13100, a coding unit determiner 13200, and an output unit 13300. Hereinafter, for convenience of description, video encoding apparatus 13000 involving video prediction based on coding units according to a tree structure according to an exemplary embodiment is referred to as 'the video encoding apparatus 1300.

The maximum coding unit splitter 13100 may split a current picture based on a maximum coding unit that is a coding unit having a maximum size for a current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2 (i.e., $2^N$). The image data may be output to the coding unit determiner 13200 according to the at least one maximum coding unit.

A coding unit according to an exemplary embodiment may be characterized by a maximum size and a depth. The depth denotes the number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Because a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Because the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 13200 encodes at least one split region obtained by splitting a region of the maximum coding unit according to depths, and determines a depth to output a finally encoded image data according to the at least one split region. In other words, the coding unit determiner 13200 determines a coded depth by encoding the image data in the deeper coding units according to depths, according to the maximum coding unit of the current picture, and selecting a depth having the smallest encoding error. The determined coded depth and the encoded image data according to the determined coded depth are output to the output unit 13300.

The image data in the maximum coding unit is encoded based on the deeper coding units corresponding to at least one depth equal to or below the maximum depth, and results of encoding the image data are compared based on each of the deeper coding units. A depth having the smallest encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 1320 according to an exemplary embodiment may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Because the number of deeper coding units increases whenever the maximum coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a maximum coding unit.

The video encoding apparatus 13000 according to an exemplary embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 13000 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one selected from an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a smallest encoding error.

The video encoding apparatus 13000 according to an exemplary embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in a manner similar to that in which the coding unit is split according to the tree structure according to an exemplary embodiment. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit according to an exemplary embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the coding unit determiner 13200 not only determines a coded depth having a smallest encoding error, but also determines a partition type in a prediction unit, a prediction mode according to prediction units, and a size of a transformation unit for transformation.

Coding units according to a tree structure in a maximum coding unit and methods of determining a prediction unit/ partition, and a transformation unit, according to exemplary embodiments, will be described in detail with reference to FIGS. 15 through 25.

The coding unit determiner 13200 may measure an encoding error of deeper coding units according to depths by using Rate-Distortion Optimization based on Lagrangian multipliers.

The output unit 13300 outputs the image data of the maximum coding unit, which is encoded based on the at least one coded depth determined by the coding unit determiner 13200, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Because at least one coding unit of the lower depth exists in one coding unit of the current depth, the encoding is repeatedly performed on each coding unit of the lower depth, and thus the encoding may be recursively performed for the coding units having the same depth.

Because the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations because the image data is hierarchically split according to depths, and thus information about the coded depth and the encoding mode may be set for the image data.

Accordingly, the output unit 13300 according to an exemplary embodiment may assign encoding information about a corresponding coded depth and an encoding mode to at least one selected from the coding unit, the prediction unit, and a minimum unit included in the maximum coding unit.

The minimum unit according to an exemplary embodiment is a square data unit obtained by splitting the minimum coding unit constituting the lowermost depth by 4. Alternatively, the minimum unit according to an exemplary embodiment may be a maximum square data unit that may be included in all of the coding units, prediction units, partition units, and transformation units included in the maximum coding unit.

For example, the encoding information output by the output unit 1330 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 13300 may encode and output reference information related to prediction, prediction information, and slice type information.

In the video encoding apparatus 13000, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 13000 may form the coding units having the tree structure by determining coding units having an optimum shape and an optimum size for each maximum coding unit, based on the size of the maximum coding unit and the maximum depth determined considering characteristics of the current picture. Also, because encoding may be performed on each maximum coding unit by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 13000, image compression efficiency may be increased because a coding unit is adjusted while considering characteristics of an image while increasing a maximum size of a coding unit while considering a size of the image.

Figure 14:
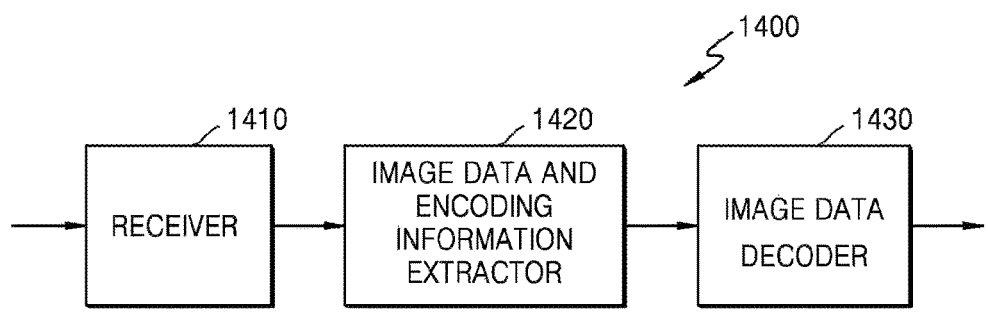
FIG. 14 is a block diagram illustrating a video decoding apparatus based on coding units having a tree structure, according to an exemplary embodiment.

FIG. 14 is a block diagram illustrating a video decoding apparatus 200 based on coding units having a tree structure, according to an exemplary embodiment.

The video decoding apparatus 1400 that involves video prediction based on coding units having a tree structure according to an exemplary embodiment includes a receiver 1410, an image data and encoding information extractor 1420, and an image data decoder 1430. Hereinafter, for convenience of description, the video decoding apparatus 1400 involving video prediction based on coding units according to a tree structure according to an exemplary embodiment is referred to as the video decoding apparatus 1400.

Definitions of various terms, such as a coding unit, a depth, a prediction unit, a transformation unit, and information about various encoding modes, for decoding operations of the video decoding apparatus 1400 are identical to those described with reference to the video encoding apparatus 100 of FIG. 1.

The receiver 1410 receives and parses a bitstream of an encoded video. The image data and encoding information extractor 1420 extracts encoded image data for each coding unit from the parsed bitstream, wherein the coding units have a tree structure according to each maximum coding unit, and outputs the extracted image data to the image data decoder 1430. The image data and encoding information extractor 1420 may extract information about a maximum size of a coding unit of a current picture, from a header about the current picture, a sequence parameter set, or a picture parameter set.

Also, the image data and encoding information extractor 1420 extracts information about a coded depth and an encoding mode for the coding units having a tree structure according to each maximum coding unit, from the parsed bitstream. The extracted information about the coded depth and the encoding mode is output to the image data decoder 1430. In other words, the image data in a bit stream is split into the maximum coding unit so that the image data decoder 1430 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 1420 is information about a coded depth and an encoding mode determined to generate a minimum encoding error when an encoder, such as the video encoding apparatus 1300, repeatedly performs encoding for each deeper coding unit according to depths according to each maximum coding unit. Accordingly, the video decoding apparatus 1400 may restore an image by decoding the image data according to a coded depth and an encoding mode that generates the minimum encoding error.

Because encoding information about the coded depth and the encoding mode according to an exemplary embodiment may be assigned to a predetermined data unit from among a corresponding coding unit, a prediction unit, and a minimum unit, the image data and encoding information extractor 1420 may extract the information about the coded depth and the encoding mode according to the predetermined data units. If information about a coded depth and encoding mode of a corresponding maximum coding unit is recorded according to predetermined data units, the predetermined data units to which the same information about the coded depth and the encoding mode is assigned may be inferred to be the data units included in the same maximum coding unit.

The image data decoder 1430 restores the current picture by decoding the image data in each maximum coding unit based on the information about the coded depth and the encoding mode according to the maximum coding units. In other words, the image data decoder 1430 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 1430 may perform intra prediction or motion compensation according to a partition and a prediction mode of each coding unit, based on the information about the partition type and the prediction mode of the prediction unit of the coding unit according to coded depths.

In addition, the image data decoder 1430 may read information about a transformation unit according to a tree structure for each coding unit so as to perform inverse transformation based on transformation units for each coding unit, for inverse transformation for each maximum coding unit. Via the inverse transformation, a pixel value of a spatial region of the coding unit may be restored.

The image data decoder 1430 may determine a coded depth of a current maximum coding unit by using split information according to depths. If the split information indicates that image data is no longer split in the current depth, the current depth is a coded depth. Accordingly, the image data decoder 230 may decode encoded data in the current maximum coding unit by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Thus, the video decoding apparatus 1400 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 15:
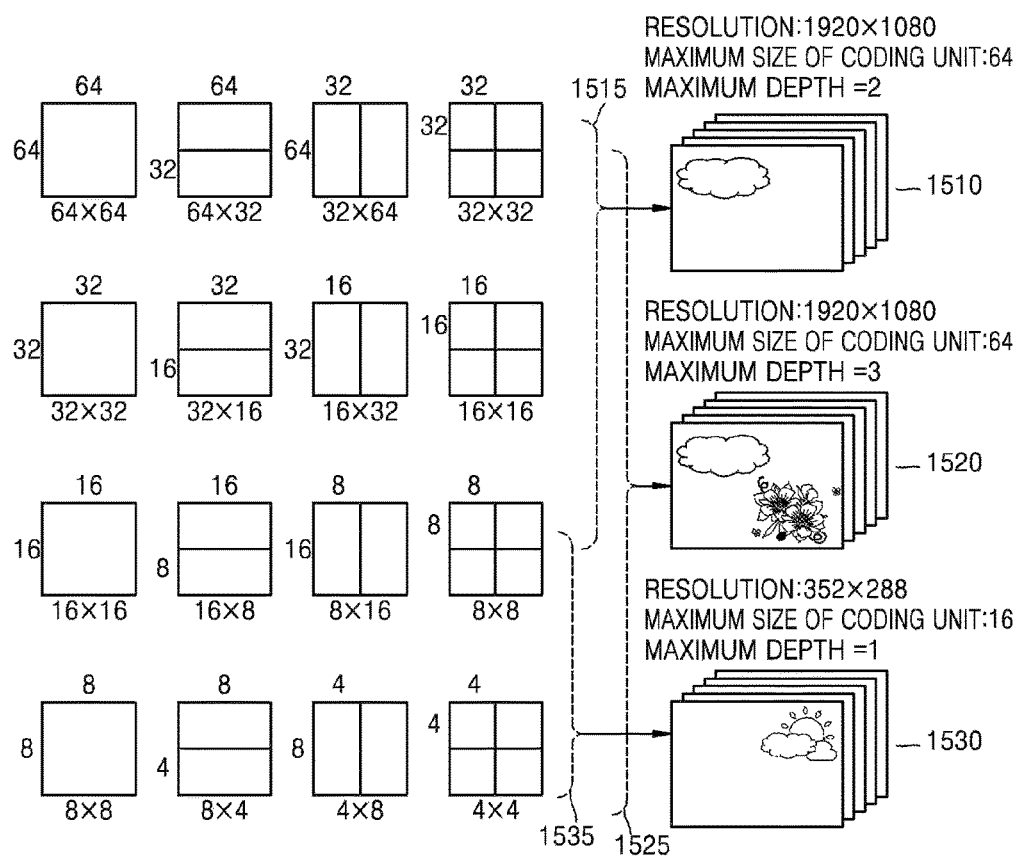
FIG. 15 is a diagram illustrating a concept of coding units according to an exemplary embodiment.

FIG. 15 is a diagram illustrating a concept of coding units according to an exemplary embodiment.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1510, a resolution is 1920×1080, a maximum size of a coding unit is 64, and a maximum depth is 2. In video data 1520, a resolution is 1920×1080, a maximum size of a coding unit is 64, and a maximum depth is 3. In video data 1530, a resolution is 352×288, a maximum size of a coding unit is 16, and a maximum depth is 1. The maximum depth shown in FIG. 15 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 1510 and 1520 having a higher resolution than the video data 1530 may be 64.

Because the maximum depth of the video data 1510 is 2, coding units 1515 of the vide data 310 may include a maximum coding unit having a long axis size of 64, and coding units having long axis sizes of 32 and 16 because depths are deepened to two layers by splitting the maximum coding unit twice. Because the maximum depth of the video data 330 is 1, coding units 1535 of the video data 1530 may include a maximum coding unit having a long axis size of 16, and coding units having a long axis size of 8 because depths are deepened to one layer by splitting the maximum coding unit once.

Because the maximum depth of the video data 1520 is 3, coding units 1525 of the video data 1520 may include a maximum coding unit having a long axis size of 64, and coding units having long axis sizes of 32, 16, and 8 because the depths are deepened to 3 layers by splitting the maximum coding unit three times. As a depth deepens, detailed information may be precisely expressed.

Figure 16:
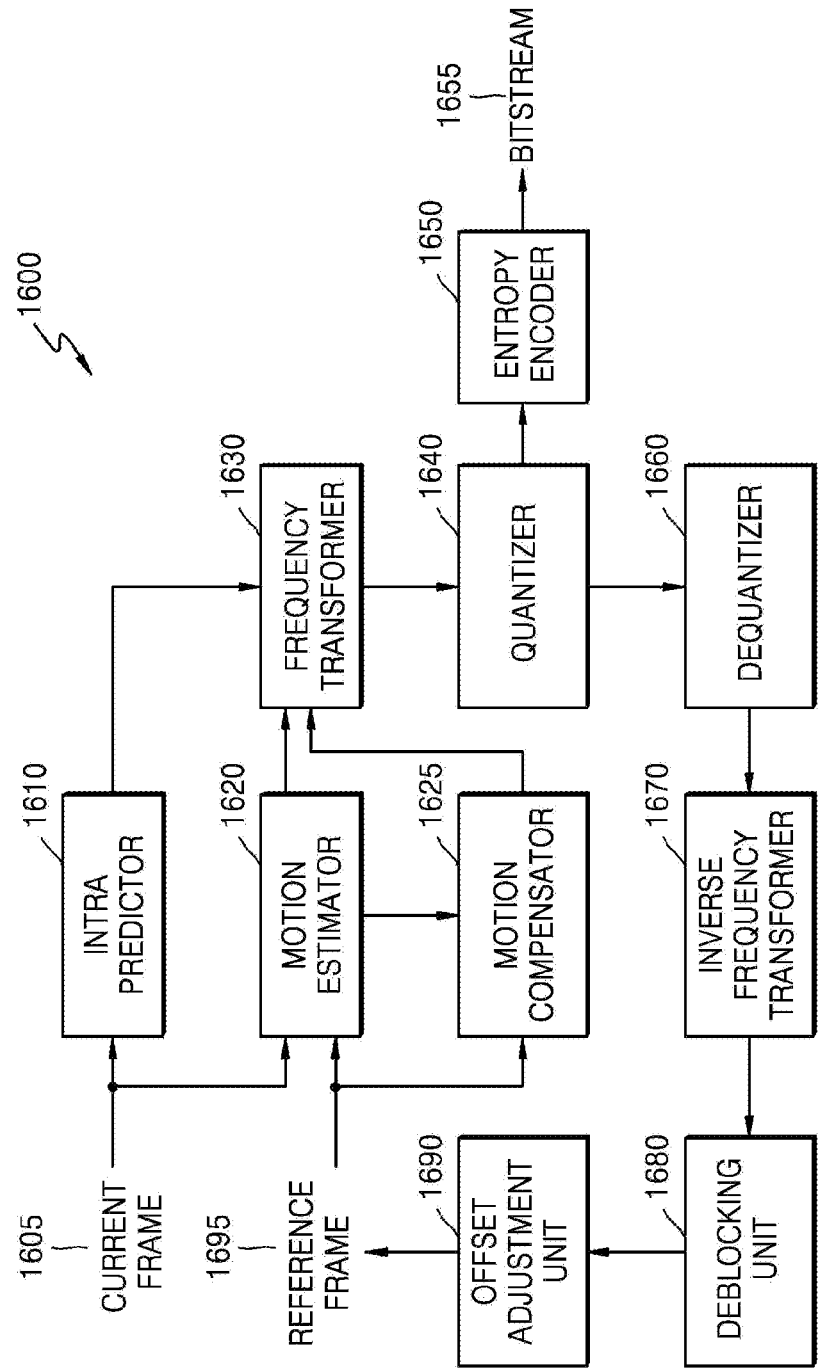
FIG. 16 is a block diagram illustrating an image encoder based on coding units, according to an exemplary embodiment.

FIG. 16 is a block diagram of an image encoder 1600 based on coding units, according to an exemplary embodiment.

The image encoder 1600 according to an exemplary embodiment performs operations of the coding unit determiner 1320 of the video encoding apparatus 13000 to encode image data. In other words, an intra predictor 1610 performs intra prediction on coding units in an intra mode, from among a current frame 1605, and a motion estimator 1620 and a motion compensator 1625 respectively perform inter estimation and motion compensation on coding units in an inter mode from among the current frame 1625 by using the current frame 1605, and a reference frame 165.

Data output from the intra predictor 1610, the motion estimator 1620, and the motion compensator 1625 is output as a quantized transformation coefficient through a transformer 1630 and a quantizer 1640. The quantized transformation coefficient is restored as data in a spatial domain through an inverse quantizer 1660 and an inverse transformer 1670, and the restored data in the spatial domain is output as the reference frame 1695 after being post-processed through a deblocking unit 1680 and an offset adjusting unit 1690. The quantized transformation coefficient may be output as a bitstream 1655 through an entropy encoder 1650.

In order for the image encoder 1600 to be applied in the video encoding apparatus 100 according to an exemplary embodiment, all elements of the image encoder 1600, i.e., the intra predictor 1610, the motion estimator 1620, the motion compensator 1625, the transformer 1630, the quantizer 1640, the entropy encoder 1650, the inverse quantizer 1660, the inverse transformer 1670, the deblocking unit 1680, and the offset adjusting unit 1690 perform operations based on each coding unit among coding units having a tree structure while considering the maximum depth of each maximum coding unit.

Specifically, the intra predictor 1610, the motion estimator 1620, and the motion compensator 1625 determines partitions and a prediction mode of each coding unit from among the coding units having a tree structure while considering the maximum size and the maximum depth of a current maximum coding unit, and the transformer 1630 determines the size of the transformation unit in each coding unit from among the coding units having a tree structure.

Figure 17:
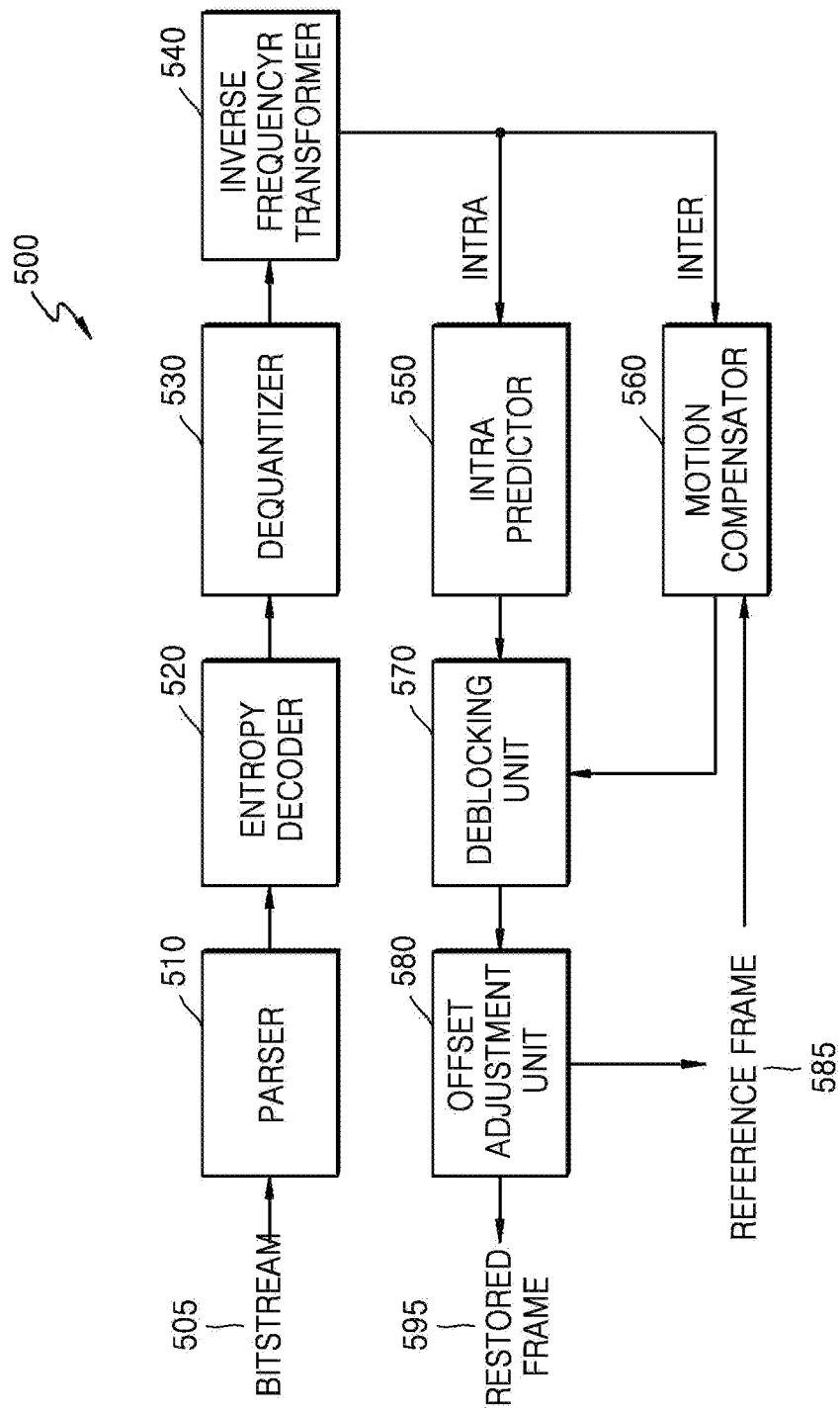
FIG. 17 is a block diagram illustrating an image decoder based on coding units, according to an exemplary embodiment.

FIG. 17 is a block diagram illustrating an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and an offset adjustor 580. Also, the image data that is post-processed through the deblocking unit 570 and the offset adjustor 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520 according to an exemplary embodiment, the inverse quantizer 530, the inverse transformer 540, the intra predictor 550, the motion compensator 560, the deblocking unit 570, and the offset adjustor 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

Figure 18:
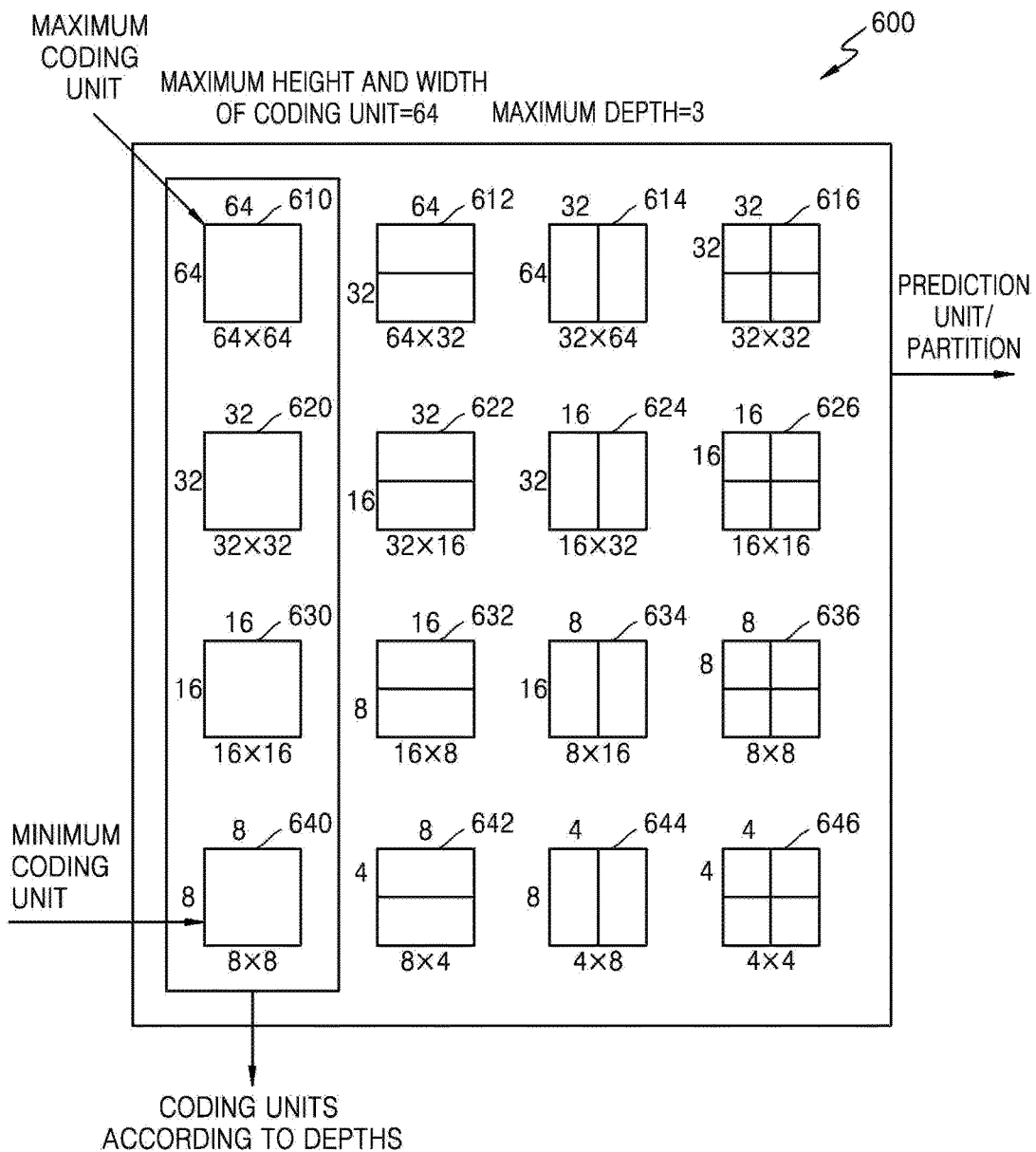
FIG. 18 is a diagram illustrating deeper coding units according to depths and prediction units, according to an exemplary embodiment.

FIG. 18 is a diagram illustrating deeper coding units according to depths, and partitions, according to an exemplary embodiment.

The video encoding apparatus 100 according to an exemplary embodiment and the video decoding apparatus 200 according to an exemplary embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units according to an exemplary embodiment, according to an exemplary embodiment, the maximum height and the maximum width of the coding units are each 64, and the maximum depth is 3. In this case, the maximum depth refers to a total number of times the coding unit is split from the maximum coding unit to the minimum coding unit. Because a depth deepens along a vertical axis of the hierarchical structure 600 according to an exemplary embodiment, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 8×8 and a depth of 3 is a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the coding unit determiner 120 of the video encoding apparatus 100 according to an exemplary embodiment performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a smallest encoding error may be selected for the current depth by performing encoding for each prediction unit in the coding units corresponding to the current depth, along the horizontal axis of the hierarchical structure 600. Alternatively, the minimum encoding error may be searched for by comparing the smallest encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 19 is a diagram illustrating a relationship between a coding unit 710 and transformation units 720, according to an exemplary embodiment.

The video encoding apparatus 100 according to an exemplary embodiment or the video decoding apparatus 200 according to an exemplary embodiment encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 13000 according to an exemplary embodiment or the video decoding apparatus 1400 according to an exemplary embodiment, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 20 is a diagram illustrating encoding information of coding units corresponding to a coded depth, according to an exemplary embodiment.

The output unit 130 of the video encoding apparatus 100 according to an exemplary embodiment may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 1420 of the video decoding apparatus 1400 may extract and use the information 800, 810, and 820 for decoding, according to each deeper coding unit.

Figure 21:
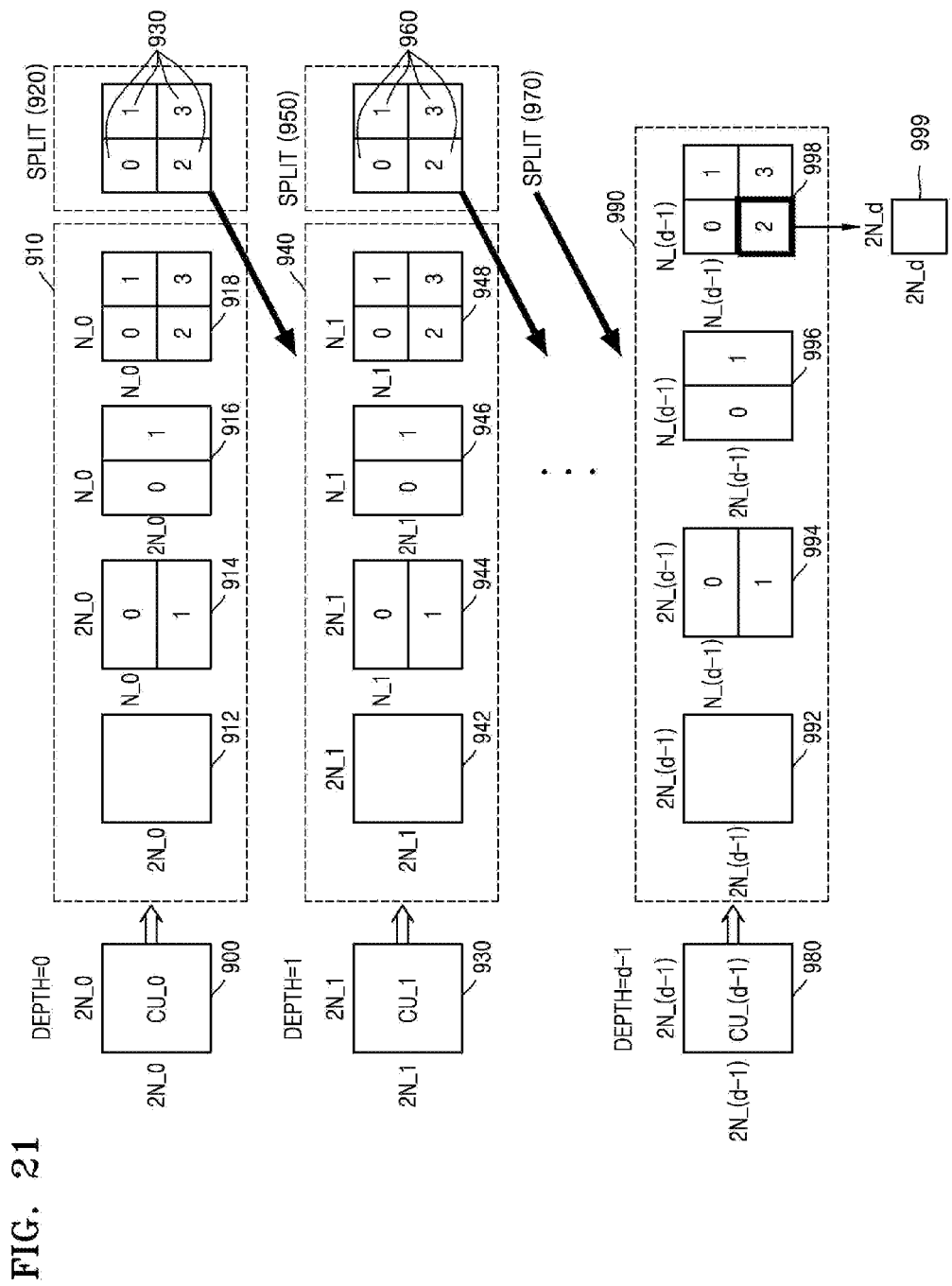
FIG. 21 is a diagram illustrating deeper coding units according to depths according to an exemplary embodiment.

FIG. 21 is a diagram illustrating deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, because a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, because the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment of the present invention may be a square data unit obtained by splitting a minimum coding unit 980 by 4. By performing the encoding repeatedly, the video encoding apparatus 100 may select a depth having the smallest encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the smallest encoding error may be determined as a coded depth. The coded depth, the partition type of the prediction unit, and the prediction mode may be encoded and transmitted as information about an encoding mode. Also, because a coding unit is split from a depth of 0 to a coded depth, only split information of the coded depth is set to 0, and split information of depths excluding the coded depth is set to 1.

The image data and encoding information extractor 220 of the video decoding apparatus 200 according to an exemplary embodiment may extract and use the information about the coded depth and the prediction unit of the coding unit 900 to decode the partition 912. The video decoding apparatus 200 according to an exemplary embodiment may determine a depth, in which split information is 0, as a coded depth by using split information according to depths, and use information about an encoding mode of the corresponding depth for decoding.

Figure 22:
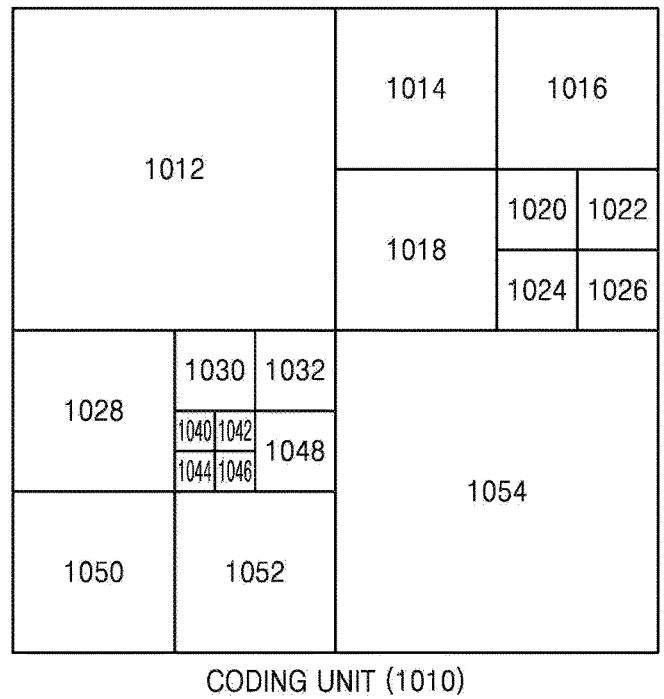
FIGS. 22, 23, and 24 are diagrams illustrating a relationship between coding units, prediction units, and frequency transformation units, according to an exemplary embodiment.
Figure 23:
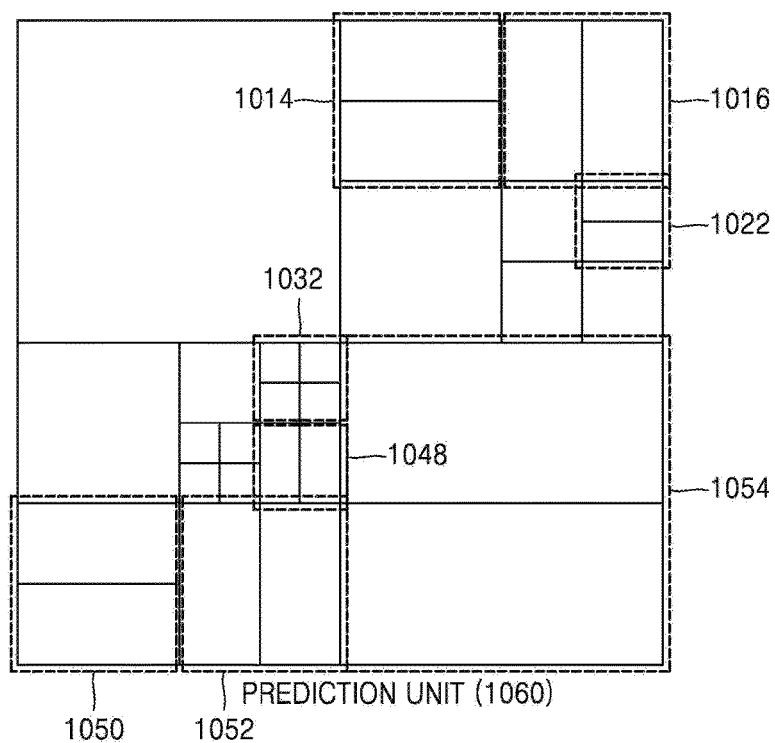
Figure 24:
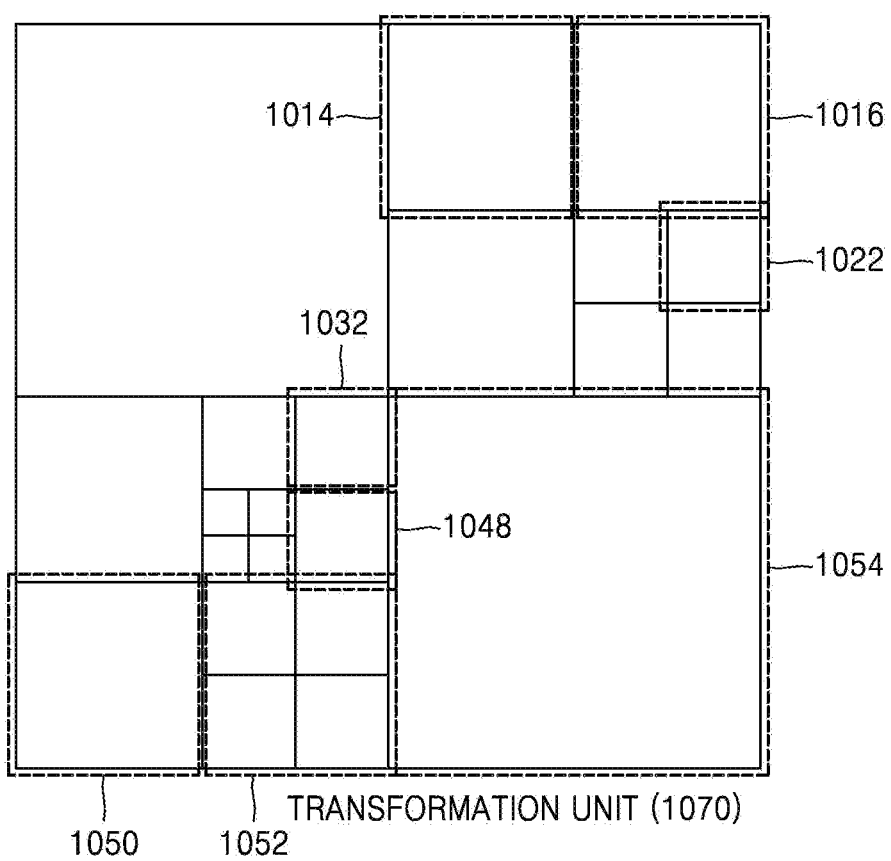

FIGS. 22 through 24 are diagrams illustrating a relationship between coding units 1010, prediction units 1060, and transformation units 1070, according to an exemplary embodiment of the present invention.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 according to embodiments may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200 according to embodiments.

The output unit 130 of the video encoding apparatus 100 according to an exemplary embodiment may output the encoding information about the coding units having a tree structure, and the image data and encoding information extractor 220 of the video decoding apparatus 200 according to an exemplary embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure according to an exemplary embodiment may include at least one selected from a coding unit correspond-

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | | ing to a coded depth, a prediction unit, and a minimum unit. The coding unit corresponding to the coded depth may include at least one selected from a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 25:
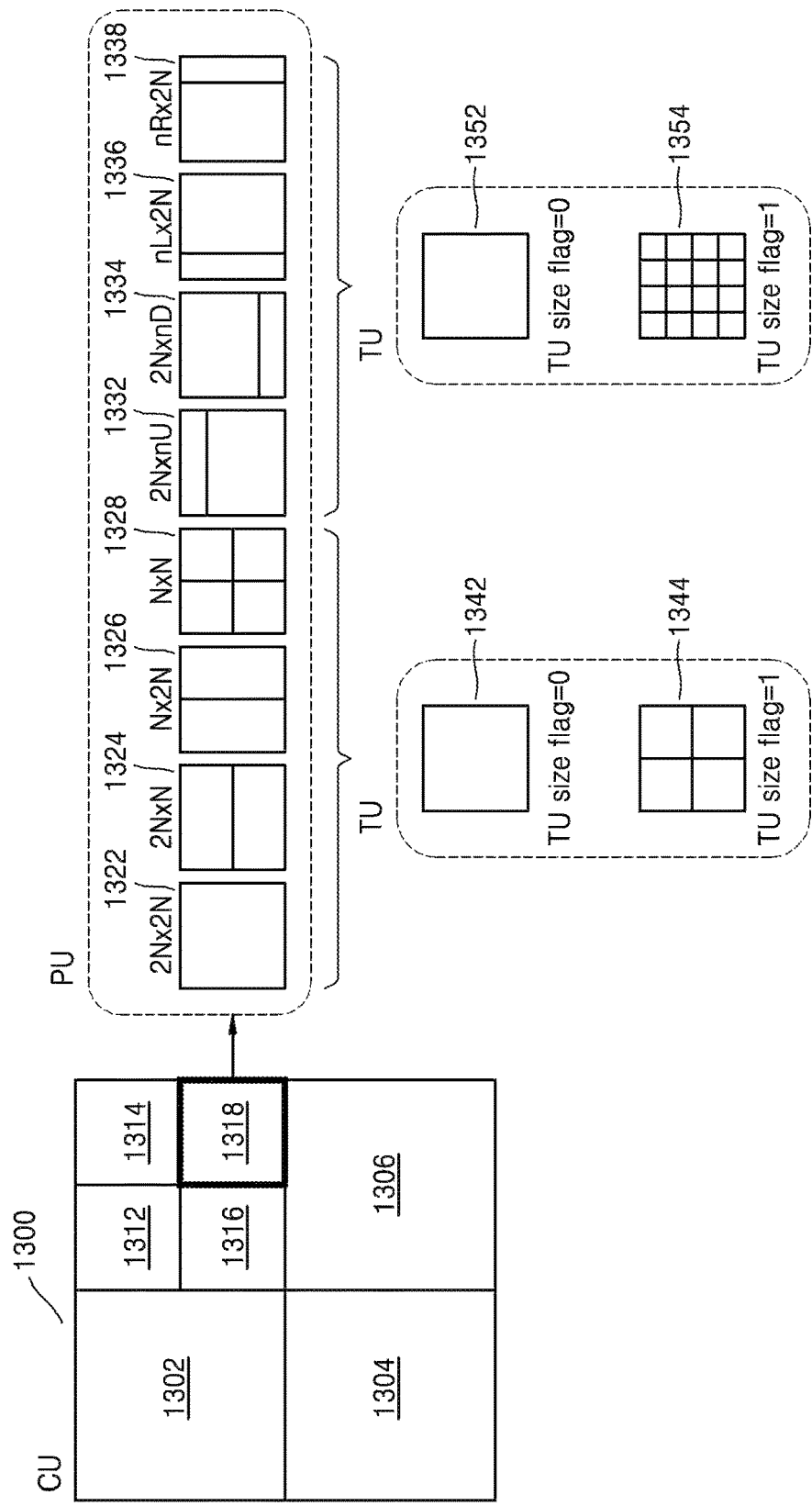
FIG. 25 is a diagram illustrating a relationship between a coding unit, a prediction unit, and a transformation unit, according to the encoding mode information of Table 2.

FIG. 25 is a diagram for describing a relationship between a coding unit, a prediction unit, and a transformation unit, according to encoding mode information of Table 1.

A maximum coding unit 1300 includes coding units 1302, 1304, 1306, 1312, 1314, 1316, and 1318 of coded depths. Here, because the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a type of a transformation index. The size of the transformation unit corresponding to the transformation index may be changed according to a prediction unit type or partition type of the coding unit.

For example, when the partition type is set to be symmetrical, i.e. the partition type 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 25, the TU size flag is a flag having a value or 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an exemplary embodiment according to the present invention, together with a maximum size and minimum size of the transformation unit. The video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, because the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize}=\max(\text{MinTransformSize},\text{RootTuSize}/(2^{\wedge}\text{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment according to the present invention, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize}=\min(\text{MaxTransformSize},\text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize}=\min(\text{MaxTransformSize},\text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present invention is not limited thereto.

The maximum coding unit including the coding units having the tree structure described with reference to FIGS. 13 through 25 above is variously named as a coding block tree, a block tree, a root block tree, a coding tree, a coding root, or a tree trunk.

The exemplary embodiments may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs). The computer readable recording medium can also be distributed over network coupled computer systems so that the computer readable code is stored and executed in a distributed fashion.

While this disclosure has been particularly shown and described with reference to embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description but by the appended claims, and all differences within the scope will be construed as being included therein.

The invention claimed is:

1. A method of encoding a multilayer video, the method comprising:
    performing inter-layer prediction on a picture of each layer in the multilayer video;
    determining a reference layer which the picture of the each layer refers to based on a result of performing the inter-layer prediction; and
    adding reference layer information of each layer to a parameter set including information commonly applied to layers in the multilayer video,
    wherein the reference layer information is added to at least one of a video parameter set (VPS), a sequence parameter set (SPS), and a picture parameter set (PPS),
    wherein the reference layer information includes a flag layer_dependency_present_flag indicating whether a current layer is a dependent layer including a picture predicted by referring to other picture included in other layer or is an independent layer without referring to the other picture included in the other layer, and
    when the flag layer_dependency_present_flag indicates that the current layer is the dependent layer, the reference layer information further includes a flag direct_reference_flag[i][j] indicating whether the current layer i having an index i refers to a layer j having a different index j, where i and j are integers, and
    when the flag layer_dependency_present_flag indicates that the current layer is the independent layer, the flag direct_reference_flag[i][j] for the current layer is not obtained from the bitstream.

2. The method of claim 1, wherein the current layer i having the index i does not refer to a layer having an index of a value greater than a value of the index i.

3. A method of decoding a multilayer video, the method comprising:
    acquiring reference layer information of each layer from a parameter set including information commonly applied to layers in the multilayer video;
    determining a reference layer which a picture in the each layer refers to based on the reference layer information of the each layer; and
    performing inter-layer prediction on inter-predicted pictures among pictures in the each layer by using the determined reference layer,
    wherein the reference layer information is added to at least one of a video parameter set (VPS), a sequence parameter set (SPS), and a picture parameter set (PPS),
    wherein the reference layer information includes a flag layer_dependency_present_flag indicating whether a current layer is a dependent layer including a picture predicted by referring to other picture included in other layer or is an independent layer without referring to the other picture included in the other layer, and
    when the flag layer_dependency_present_flag indicates that the current layer is the dependent layer, the reference layer information further includes a flag direct_reference_flag[i][j] indicating whether the current layer i having an index i refers to a layer j having a different index j, where i and j are integers, and
    when the flag layer_dependency_present_flag indicates that the current layer is the independent layer, the flag direct_reference_flag[i][j] for the current layer is not obtained from the bitstream.

4. The method of claim 3, wherein the current layer i having the index i does not refer to a layer having an index of a value greater than a value of the index i.

* * * * *